United States Patent
Xu et al.

(10) Patent No.: US 12,317,340 B2
(45) Date of Patent: May 27, 2025

(54) COMMUNICATION METHOD AND APPARATUS

(71) Applicant: HUAWEI TECHNOLOGIES CO., LTD., Guangdong (CN)

(72) Inventors: Xiaoying Xu, Shenzhen (CN); Qinghai Zeng, Shanghai (CN); Feng Han, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 425 days.

(21) Appl. No.: 17/886,526

(22) Filed: Aug. 12, 2022

(65) Prior Publication Data

US 2022/0394787 A1 Dec. 8, 2022

Related U.S. Application Data

(63) Continuation of application No. PCT/CN2021/072542, filed on Jan. 18, 2021.

(30) Foreign Application Priority Data

Feb. 13, 2020 (CN) .......................... 202010091368.9

(51) Int. Cl.
*H04W 76/12* (2018.01)
*H04L 1/00* (2006.01)
(Continued)

(52) U.S. Cl.
CPC ........... *H04W 76/12* (2018.02); *H04L 1/0026* (2013.01); *H04W 72/20* (2023.01); *H04W 76/15* (2018.02); *H04L 1/1812* (2013.01)

(58) Field of Classification Search
CPC ..... H04W 76/12; H04W 76/15; H04W 72/20; H04L 1/0026; H04L 1/1812
(Continued)

(56) References Cited

U.S. PATENT DOCUMENTS 10,455,456 B2 * 10/2019 Jang ................. H04W 72/1215
10,952,184 B2 * 3/2021 Fujishiro ............... H04W 76/11
(Continued)

FOREIGN PATENT DOCUMENTS

CN 101902817 A 12/2010
CN 105580419 B * 2/2020 ........... H04B 7/2612
(Continued)

OTHER PUBLICATIONS

3GPP TS 38.425 V15.6.0 (Jul. 2019), "3rd Generation Partnership Project; Technical Specification Group Radio Access Network; NG-RAN; NR user plane protocol (Release 15)," Jul. 2019, 22 pages.
(Continued)

*Primary Examiner* — Melvin H Pollack
(74) *Attorney, Agent, or Firm* — Fish & Richardson P.C.

(57) ABSTRACT

The disclosure provides communication methods and apparatuses. One example method includes that a second communication apparatus establishes at least one tunnel for a first radio bearer, where the at least one tunnel includes a first tunnel. The second communication apparatus sends a first message to a first communication apparatus, where the first message is carried in the first tunnel, the first message includes radio quality information of each of M logical channels, and the M logical channels are associated with the first radio bearer, where M is an integer greater than or equal to 1.

20 Claims, 8 Drawing Sheets

(51) Int. Cl.
*H04L 1/1812* (2023.01)
*H04W 72/20* (2023.01)
*H04W 76/15* (2018.01)

(58) Field of Classification Search
USPC .......................................................... 370/329
See application file for complete search history.

(56) References Cited

U.S. PATENT DOCUMENTS

| | | | |
|---|---|---|---|
| 11,012,194 B2* | 5/2021 | Zhang | H04L 5/0044 |
| 11,109,413 B2* | 8/2021 | Babaei | H04L 1/1819 |
| 11,116,024 B2* | 9/2021 | Yu | H04W 40/12 |
| 11,116,025 B2* | 9/2021 | Mochizuki | H04W 72/56 |
| 11,153,044 B2* | 10/2021 | Shim | H04W 72/1268 |
| 11,258,549 B2* | 2/2022 | Park | H04W 24/08 |
| 11,425,581 B2* | 8/2022 | Teyeb | H04W 76/15 |
| 11,425,752 B2* | 8/2022 | Adjakple | H04W 72/1268 |
| 11,490,275 B2* | 11/2022 | Xu | H04L 5/0053 |
| 11,678,246 B2* | 6/2023 | Park | H04W 36/305 455/436 |
| 11,711,167 B2* | 7/2023 | Kuo | H04L 5/0032 370/329 |
| 11,800,503 B2* | 10/2023 | Shim | H04W 76/11 |
| 11,832,264 B2* | 11/2023 | Xiong | H04L 5/0092 |
| 11,838,936 B2* | 12/2023 | Kung | H04W 72/54 |
| 11,871,375 B2* | 1/2024 | Sirotkin | H04L 1/1896 |
| 11,956,789 B2* | 4/2024 | Alfarhan | H04W 80/02 |
| 11,974,317 B2* | 4/2024 | Yang | H04W 76/23 |
| 12,010,619 B2* | 6/2024 | Zhou | H04W 24/02 |
| 12,035,169 B2* | 7/2024 | Kim | H04W 28/0278 |
| 12,035,404 B2* | 7/2024 | Cirik | H04B 7/0695 |
| 12,052,743 B2* | 7/2024 | Panteleev | H04L 5/0053 |
| 12,089,088 B2* | 9/2024 | Hu | H04W 84/005 |
| 12,089,220 B2* | 9/2024 | Zhou | H04W 52/0206 |
| 12,120,756 B2* | 10/2024 | Wang | H04W 28/0236 |
| 2018/0343581 A1* | 11/2018 | Jang | H04W 72/21 |
| 2021/0051738 A1* | 2/2021 | Babaei | H04W 74/002 |
| 2021/0099910 A1* | 4/2021 | Park | H04L 41/0816 |
| 2021/0274539 A1* | 9/2021 | Babaei | H04W 74/08 |
| 2023/0422089 A1* | 12/2023 | Babaei | H04W 74/006 |
| 2024/0107572 A1* | 3/2024 | Paladugu | H04W 72/21 |
| 2024/0284375 A1* | 8/2024 | Khoshkholgh Dashtaki | H04W 72/21 |
| 2024/0306033 A1* | 9/2024 | Elshafie | H04W 28/0278 |

FOREIGN PATENT DOCUMENTS

| | | | | |
|---|---|---|---|---|
| EP | 2584818 A1 * | 4/2013 | | H04B 7/0417 |
| EP | 2919535 A1 | 9/2015 | | |
| EP | 3713288 A1 | 9/2020 | | |
| JP | 2020511853 A * | 1/2018 | | |
| TW | 1711330 B * | 1/2019 | | |
| WO | 2015013925 A1 | 2/2015 | | |
| WO | WO-2018169242 A1 * | 9/2018 | | H04L 1/02 |
| WO | 2019095933 A1 | 5/2019 | | |
| WO | 2019160959 A1 | 8/2019 | | |
| WO | 2019245447 A1 | 12/2019 | | |
| WO | WO-2020060141 A1 * | 3/2020 | | |

OTHER PUBLICATIONS

LG Electronics Inc., "Transmission of Scheduling Information," 3GPP TSG-RAN WG2 meeting #48, R2-052037, London, UK, Aug. 29-Sep. 2, 2005, 5 pages.

PCT International Search Report and Written Opinion issued in International Application No. PCT/CN2021/072542 on Mar. 26, 2021, 13 pages (with English translation).

Extended European Search Report in European Appln No. 21753230. 8, dated May 22, 2023, 11 pages.

* cited by examiner

COMMUNICATION METHOD AND APPARATUS

CROSS-REFERENCE TO RELATED APPLICATIONS

This application is a continuation of International Application No. PCT/CN2021/072542, filed on Jan. 18, 2021, which claims priority to Chinese Patent Application No. 202010091368.9, filed on Feb. 13, 2020. The disclosures of the aforementioned applications are hereby incorporated by reference in their entireties.

TECHNICAL FIELD

This application relates to the field of wireless communication technologies, and in particular, to a communication method and apparatus.

BACKGROUND

In a 5th generation (5G) mobile communication technology system, a duplication transmission function at a packet data convergence protocol (PDCP) layer is introduced. After the PDCP duplication transmission function is activated, a data packet of a radio bearer is replicated into a plurality of same data packets, and then the plurality of data packets are separately delivered to a plurality of different radio link control (RLC) entities for transmission, and then is transmitted to a media access control (MAC) entity through different logical channels (LCHs).

In a dual connectivity (DC) scenario, a terminal device may be simultaneously connected to two network devices: a primary network device and a secondary network device. Therefore, the plurality of different RLC entities are located in the primary network device and the secondary network device.

For the DC scenario, how to optimize data transmission still needs to be further studied.

SUMMARY

This application provides a communication method and apparatus, to transmit logical channel-level radio quality information, so that data transmission can be optimized more effectively based on the logical channel-level radio quality information.

According to a first aspect, an embodiment of this application provides a communication method, where the method may be applied to a second communication apparatus. In the method, the second communication apparatus may establish at least one tunnel for a first radio bearer, where the at least one tunnel includes a first tunnel. The second communication apparatus sends a first message to a first communication apparatus, where the first message is carried in the first tunnel, the first message includes radio quality information of each of M logical channels, and the M logical channels are associated with the first radio bearer, where M is an integer greater than or equal to 1.

According to the method, the second communication apparatus may send logical channel-level radio quality information to the first communication apparatus, so that the first communication apparatus can optimize data transmission more effectively based on the logical channel-level radio quality information.

In a possible design, the radio quality information of each logical channel includes at least one of the following: average downlink channel quality indicator (CQI) information corresponding to each logical channel; an average of hybrid automatic repeat request (HARQ) failures corresponding to each logical channel; an average of HARQ retransmissions corresponding to each logical channel; a downlink radio quality index corresponding to each logical channel; an uplink radio quality index corresponding to each logical channel; or an average of clear channel assessment failures corresponding to each logical channel.

In a possible design, the first message further includes a power headroom report, and the power headroom report is obtained by the second communication apparatus from a terminal device.

In a possible design, the radio quality information of the M logical channels is sorted based on identifiers (IDs) of the M logical channels; the M logical channels correspond to the first tunnel; or the first message further includes an identifier of each of the M logical channels.

According to the foregoing solution, after the first communication apparatus receives the logical channel-level radio quality information, the first communication apparatus may distinguish the radio quality information of each logical channel.

In a possible design, the first message further includes suggestion information of each of the M logical channels, the M logical channels include a first logical channel, and suggestion information of the first logical channel is used to indicate at least one of the following: suggesting that uplink duplication transmission of the first logical channel be activated; suggesting that downlink duplication transmission of the first logical channel be activated; suggesting that uplink duplication transmission of the first logical channel not be activated; or suggesting that downlink duplication transmission of the first logical channel not be activated.

According to this solution, the first message includes the suggestion information of each of the M logical channels, so that the first communication apparatus can optimize the data transmission based on the suggestion information of each logical channel.

In a possible design, the first message further includes first indication information, and the first indication information is used to indicate that the first message includes the suggestion information of each of the M logical channels.

In a possible design, a protocol data unit (PDU) type of the first message is 0, 1, or 2, or the PDU type of the first message is an integer greater than 2.

In a possible design, the first communication apparatus is located in a first network device, and the second communication apparatus is located in a second network device.

In a possible design, the method further includes: The second communication apparatus receives a request message from the first communication apparatus, where the request message is used to request logical channel-level radio quality information.

In a possible design, the first communication apparatus is located in a first distributed unit (DU), the second communication apparatus is located in a second DU, and the first DU and the second DU are both connected to a centralized unit (CU).

In a possible design, the method further includes: The second communication apparatus receives a request message from the CU, where the request message is used to request logical channel-level radio quality information.

In a possible design, that the request message is used to request radio quality information of logical channel granularity includes: The request message is used to request the radio quality information of each of M logical channels, and the M logical channels are logical channels with best radio quality in logical channels associated with the first radio bearer.

According to a second aspect, an embodiment of this application provides a communication method. The method may be applied to a first communication apparatus. In the method, the first communication apparatus receives a first message from a second communication apparatus, where the first message includes radio quality information of each of M logical channels, and the M logical channels are associated with a first radio bearer, where M is an integer greater than or equal to 1. Then, the first communication apparatus may process data transmission of the first radio bearer based on the first message.

The method provided in the second aspect corresponds to the method provided in the first aspect. Therefore, for beneficial effects of related technical features in the second aspect, refer to the first aspect. Details are not described herein again.

In a possible design, the radio quality information of each logical channel includes at least one of the following: average downlink CQI information corresponding to each logical channel; an average of HARQ failures corresponding to each logical channel; an average of HARQ retransmissions corresponding to each logical channel; a downlink radio quality index corresponding to each logical channel; an uplink radio quality index corresponding to each logical channel; or an average of clear channel assessment failures corresponding to each logical channel.

In a possible design, the first message further includes a power headroom report, and the power headroom report is obtained by the second communication apparatus from a terminal device.

In a possible design, the radio quality information of the M logical channels is sorted based on IDs of the M logical channels.

In a possible design, the M logical channels correspond to a first tunnel of the first radio bearer, and the first message is carried in the first tunnel.

In a possible design, the first message further includes an identifier of each of the M logical channels.

In a possible design, the first message further includes suggestion information of each of the M logical channels, the M logical channels include a first logical channel, and suggestion information of the first logical channel is used to indicate at least one of the following: suggesting that uplink duplication transmission of the first logical channel be activated; suggesting that downlink duplication transmission of the first logical channel be activated; suggesting that uplink duplication transmission of the first logical channel not be activated; or suggesting that downlink duplication transmission of the first logical channel not be activated.

In a possible design, the first message further includes first indication information, and the first indication information is used to indicate that the first message includes the suggestion information of each of the M logical channels.

In a possible design, a protocol data unit (PDU) type of the first message is 0, 1, or 2, or the PDU type of the first message is an integer greater than 2.

In a possible design, the first communication apparatus is located in a first network device, and the second communication apparatus is located in a second network device.

In a possible design, the method further includes: The first communication apparatus sends a request message to the second communication apparatus, where the request message is used to request logical channel-level radio quality information.

In a possible design, the first communication apparatus is located in a first DU, the second communication apparatus is located in a second DU, and the first DU and the second DU are both connected to a CU.

In a possible design, the method further includes: The first communication apparatus sends a request message to the second communication apparatus through the CU, where the request message is used to request logical channel-level radio quality information.

In a possible design, that the request message is used to request logical channel-level radio quality information includes: The request message is used to request the radio quality information of each of M logical channels, and the M logical channels are logical channels with best radio quality in logical channels associated with the first radio bearer.

According to a third aspect, an embodiment of this application provides a communication system. The communication system includes a first communication apparatus and a second communication apparatus. The second communication apparatus may be configured to perform the method according to the first aspect, and the first communication apparatus may be configured to perform the method according to the second aspect. For example, the second communication apparatus is configured to: establish at least one tunnel for a first radio bearer, where the at least one tunnel includes a first tunnel; and send a first message to the first communication apparatus, where the first message is carried in the first tunnel, the first message includes radio quality information of each of M logical channels, and the M logical channels are associated with the first radio bearer, where M is an integer greater than or equal to 1. The first communication apparatus is configured to: receive the first message from the second communication apparatus, and process data transmission of the first radio bearer based on the first message.

In a possible design, the first communication apparatus is further configured to send a request message to the second communication apparatus, where the request message is used to request logical channel-level radio quality information; and the second communication apparatus is further configured to receive the request message from the first communication apparatus.

In a possible design, the first communication apparatus is located in a first network device, and the second communication apparatus is located in a second network device; or the first communication apparatus is located in a first DU, the second communication apparatus is located in a second DU, and the first DU and the second DU are both connected to a CU.

According to a fourth aspect, this application provides a communication apparatus. The communication apparatus may be a network device (or a chip disposed in the network device) or a DU (or a chip disposed in the DU). The communication apparatus has a function for implementing the first aspect or the second aspect. For example, the communication apparatus includes modules, units, or means corresponding to performing the steps in the first aspect or the second aspect, and the functions, the units, or the means may be implemented by software or hardware, or may be implemented by hardware executing corresponding software.

In a possible design, the communication apparatus includes a processing unit and a communication unit. The communication unit may be configured to send and receive a signal, to implement communication between the communication apparatus and another apparatus. The processing unit may be configured to perform some internal operations of the communication apparatus. Functions performed by the processing unit and the communication unit may correspond to the steps in the first aspect or the second aspect.

In a possible design, the communication apparatus includes a processor, and may further include a transceiver. The transceiver is configured to receive and send a signal, and the processor executes program instructions, to complete the method in any one of the possible designs or implementations of the first aspect or the second aspect. The communication apparatus may further include one or more memories. The memory is configured to be coupled to the processor. The one or more memories may be integrated with the processor, or may be disposed independent of the processor. This is not limited in this application. The memory may store a necessary computer program or necessary instructions to implement the functions in the first aspect or the second aspect. The processor may execute the computer program or the instructions stored in the memory. When the computer program or the instructions are executed, the communication apparatus is enabled to implement the method in any one of the possible designs or implementations of the first aspect or the second aspect.

In a possible design, the communication apparatus includes a processor and a memory. The memory may store a necessary computer program or necessary instructions to implement the functions in the first aspect or the second aspect. The processor may execute the computer program or the instructions stored in the memory. When the computer program or the instructions are executed, the communication apparatus is enabled to implement the method in any one of the possible designs or implementations of the first aspect or the second aspect.

In a possible design, the communication apparatus includes at least one processor and an interface circuit, where the at least one processor is configured to: communicate with another apparatus through the interface circuit and perform the method in any possible design or implementation of the first aspect or the second aspect.

According to a fifth aspect, this application provides a computer-readable storage medium. The computer storage medium stores computer-readable instructions; and when a computer reads and executes the computer-readable instructions, the computer is enabled to perform the method in any one of the possible designs of the first aspect or the second aspect.

According to a sixth aspect, this application provides a computer program product; and when a computer reads and executes the computer program product, the computer is enabled to perform the method in any one of the possible designs of the first aspect or the second aspect.

According to a seventh aspect, this application provides a chip. The chip includes a processor, and the processor is coupled to a memory, and is configured to read and execute a software program stored in the memory, to implement the method in any one of the possible designs of the first aspect or the second aspect.

These aspects or other aspects of this application are clearer and more comprehensible in description of the following embodiments.

DESCRIPTION OF EMBODIMENTS

Figure 1A:
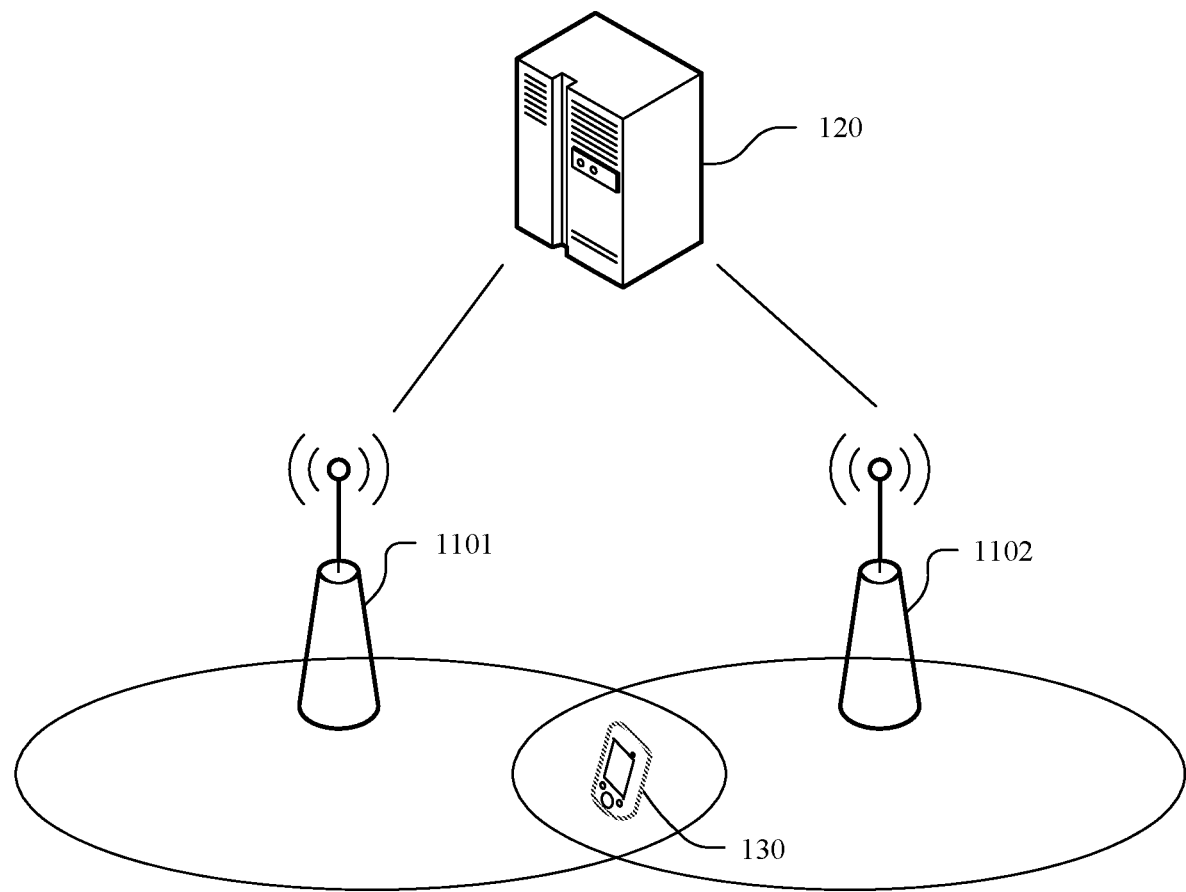
FIG. 1a is a schematic diagram of a possible system architecture to which an embodiment of this application is applicable.

The following describes the technical solutions in embodiments of the present invention with reference to the accompanying drawings in embodiments of the present invention. It is clear that the described embodiments are merely some rather than all of embodiments of the present invention.

Some terms in embodiments of this application are first described, to help a person skilled in the art have a better understanding.

(1) A terminal device may be a wireless terminal device that can receive scheduling information and indication information of a network device. The wireless terminal device may be a device that provides voice and/or data connectivity for a user, a handheld device with a wireless connection function, or another processing device connected to a wireless modem. The terminal device may communicate with one or more core networks or the Internet through a radio access network (RAN). The terminal device may be a mobile terminal device, for example, a mobile phone (or referred to as a "cellular" phone, a mobile phone), a computer, or a data card, or may be, for example, a portable, a pocket-sized, a handheld, a computer built-in, or an in-vehicle mobile apparatus that exchanges voice and/or data with the radio access network. For example, the terminal device is a device such as a personal communications service (PCS) phone, a cordless phone, a session initiation protocol (SIP) phone, a wireless local loop (WLL) station, a personal digital assistant (PDA), a tablet computer (Pad), or a computer having wireless receiving and sending functions. The wireless terminal device may alternatively be referred to as a system, a subscriber unit, a subscriber station, a mobile station, a mobile station (MS), a remote station, an access point (AP), a remote terminal device, an access terminal device, a user terminal device, a user agent, a subscriber station (SS), customer premises equipment (CPE), a terminal, user equipment (UE), a mobile terminal (MT), or the like. Alternatively, the terminal device may be a wearable device and a terminal device in a next-generation communication system, for example, a terminal device in a 5G communication system, or a terminal device in a future evolved public land mobile network (PLMN).

(2) A network device may be a device in a wireless network. For example, the network device may be a radio access network (RAN) node (or device) that connects a terminal device to the wireless network, and may also be referred to as a base station. Currently, some examples of the RAN device are a next-generation NodeB (gNodeB) in a 5G communication system, a transmission reception point (TRP), an evolved NodeB (eNB), a radio network controller (RNC), a NodeB (NB), a base station controller (BSC), a base transceiver station (BTS), a home NodeB (for example, a home evolved NodeB, or a home NodeB, HNB), a baseband unit (BBU), a wireless fidelity (Wi-Fi) access point (AP), and the like. In addition, in a network structure, the network device may be a RAN device that includes a centralized unit (CU) node and a distributed unit (DU) node. In addition, in another possible case, the network device may be another apparatus that provides a wireless communication function for the terminal device. A specific technology and a specific device form that are used by the network device are not limited in embodiments of this application. For ease of description, in embodiments of this application, an apparatus that provides a wireless communication function for a terminal device is referred to as a network device.

(3) The terms "system" and "network" may be interchangeably used in embodiments of this application. "At least one" means one or more, and "a plurality of" means two or more. The term "and/or" describes an association relationship between associated objects and indicates that three relationships may exist. For example, A and/or B may indicate the following cases: Only A exists, both A and B exist, and only B exists, where A and B may be singular or plural. The character "/" usually indicates an "or" relationship between the associated objects. "At least one of the following" or a similar expression thereof indicates any combination of the items, and includes a singular item or any combination of plural items. For example, "at least one of A, B, and C" includes A, B, C, AB, AC, BC, or ABC. In addition, unless otherwise stated, ordinal numbers such as "first" and "second" in embodiments of this application are used to distinguish between a plurality of objects, and are not used to limit an order, a time sequence, priorities, or importance of the plurality of objects.

FIG. 1a is a schematic diagram of a network architecture to which an embodiment of this application is applicable. As shown in FIG. 1a, a terminal device 130 may access a wireless network, to obtain a service of an external network (for example, the Internet) through the wireless network, or communicate with another device through the wireless network, for example, may communicate with another terminal device. The wireless network includes a radio access network (RAN) and a core network (CN). The RAN is configured to connect the terminal device 130 to the wireless network, and the CN is configured to manage the terminal device and provide a gateway for communicating with the external network. The RAN may include one or more RAN devices, for example, a RAN device 1101 and a RAN device 1102. The CN may include one or more CN devices, for example, a CN device 120.

The CN may include a plurality of CN devices 120. When the network architecture shown in FIG. 1a is applicable to a 5G communication system, the CN device 120 may be an access and mobility management function (AMF) entity, a session management function (SMF) entity, a user plane function (UPF) entity, or the like. When the network architecture shown in FIG. 1a is applicable to an LTE communication system, the CN device 120 may be a mobility management entity (MME), a serving gateway (S-GW), or the like.

It should be understood that, a quantity of devices in the communication system shown in FIG. 1a is merely used as an example, and this is not limited in embodiments of this application. In actual application, the communication system may further include more terminal devices and more RAN devices, and may further include another device.

Figure 1B:
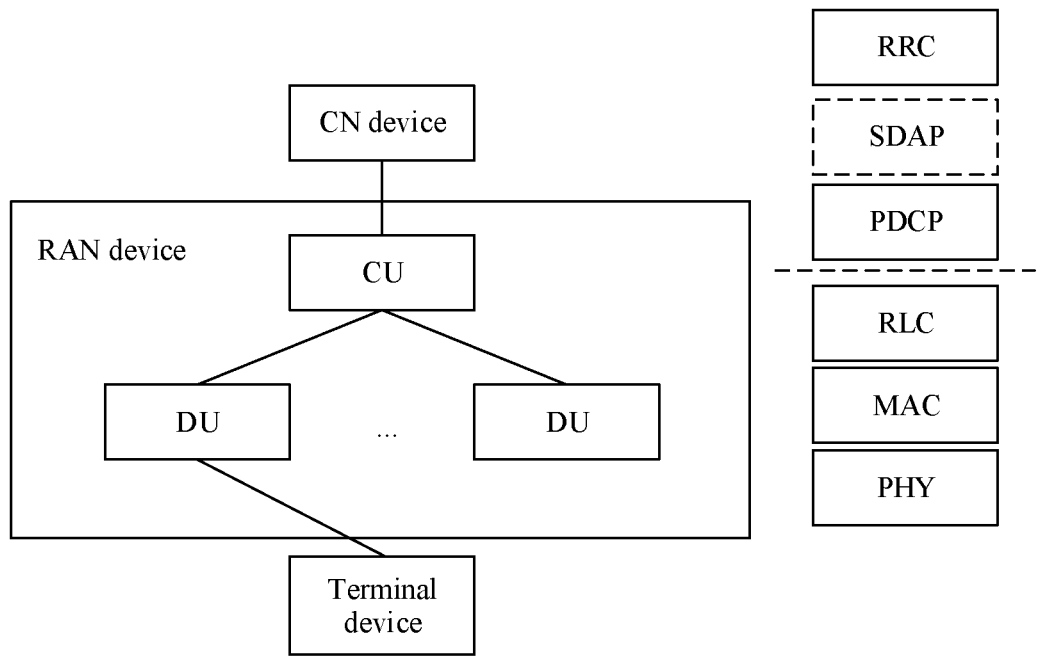
FIG. 1b is a schematic diagram of another network architecture to which an embodiment of this application is applicable.

FIG. 1b is a schematic diagram of another network architecture to which an embodiment of this application is applicable. As shown in FIG. 1b, the network architecture includes a CN device, a RAN device, and a terminal device. The RAN device includes a baseband apparatus and a radio frequency apparatus. The baseband apparatus may be implemented by one node, or may be implemented by a plurality of nodes. The radio frequency apparatus may be implemented remotely and independently from the baseband apparatus, may be integrated into the baseband apparatus, or some functions are independently integrated and some functions are integrated into the baseband apparatus. For example, in an LTE communication system, the RAN device includes the baseband apparatus and the radio frequency apparatus. The radio frequency apparatus may be remotely disposed relative to the baseband apparatus. For example, a remote radio unit (RRU) is a remote radio unit disposed relative to a BBU.

Communication between the RAN device and the terminal device complies with a specific protocol layer structure. For example, a control plane protocol layer structure may include functions of protocol layers such as a radio resource control (RRC) layer, a PDCP layer, an RLC layer, a MAC layer, and a physical (PHY) layer, and a user plane protocol layer structure may include functions of protocol layers such as the PDCP layer, the RLC layer, the MAC layer, and the physical layer. In a possible implementation, a service data adaptation (service data adaptation protocol, SDAP) layer may be further included above the PDCP layer.

The RAN device may implement the functions of the protocol layers such as the RRC layer, the PDCP layer, the RLC layer, and the MAC layer through one node or a plurality of nodes. For example, in an evolved structure, the RAN device may include a CU and a DU, and a plurality of DUs may be all controlled by one CU. As shown in FIG. 1b, the CU and the DU may be divided based on a protocol layer of a wireless network. For example, functions of the PDCP layer and a protocol layer above the PDCP layer are set on the CU, and functions of protocol layers below the PDCP layer, such as the RLC layer and the MAC layer, are set on the DU.

Division performed based on the protocol layers is merely an example, and division may alternatively be performed based on another protocol layer, for example, based on the RLC layer. Functions of the RLC layer and a layer above the RLC layer are set on the CU, and a function of a protocol layer below the RLC layer is set on the DU. Alternatively, division is performed in a protocol layer. For example, some functions of the RLC layer and a function of a protocol layer above the RLC layer are set on the CU, and remaining functions of the RLC layer and a function of a protocol layer below the RLC layer are set on the DU. In addition, division may alternatively be performed in another manner. For example, division is performed based on a latency. A function whose processing time needs to satisfy a latency requirement is set on the DU, and a function whose processing time does not need to satisfy the latency requirement is set on the CU.

In addition, the radio frequency apparatus may be independently integrated and is not placed in the DU, may be integrated into the DU, or some parts of the radio frequency apparatus are remotely deployed and some parts of the radio frequency apparatus are integrated into the DU. This is not limited herein.

Figure 1C:
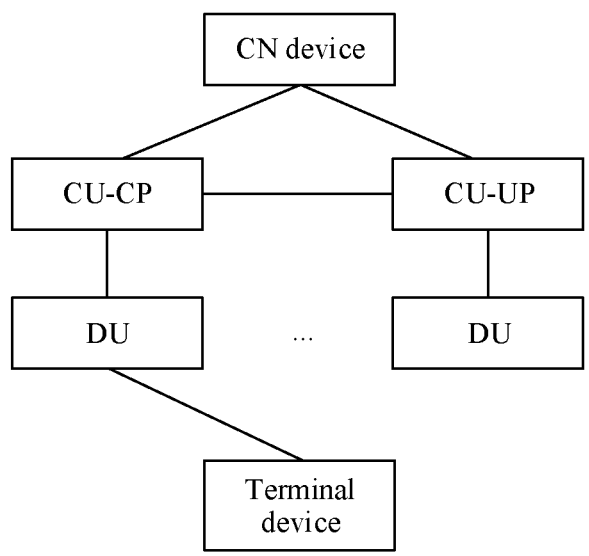
FIG. 1c is a schematic diagram of another network architecture to which an embodiment of this application is applicable.

FIG. 1c is a schematic diagram of another network architecture to which an embodiment of this application is applicable. Compared with the network architecture shown in FIG. 1b, in FIG. 1c, a control plane (CP) and a user plane (UP) of a CU may further be separated and implemented by different entities: a control plane (CP) CU entity (namely, a CU-CP entity) and a user plane (UP) CU entity (namely, a CU-UP entity).

In the foregoing network architectures, signaling generated by the CU may be sent to a terminal device through a DU, or signaling generated by the terminal device may be sent to the CU through the DU. The DU may not parse the signaling, but directly encapsulate the signaling at a protocol layer and then transparently transmit the signaling to the terminal device or the CU. In the following embodiments, if transmission of such signaling between the DU and the terminal device is related, sending or receiving of the signaling by the DU includes this scenario. For example, signaling at an RRC layer or a PDCP layer is finally processed as signaling at a PHY layer and sent to the terminal device, or is converted from received signaling at the PHY layer. In this architecture, it may also be considered that the signaling at the RRC layer or the PDCP layer is sent by the DU, or sent by the DU and a radio frequency apparatus.

In the network architecture shown in FIG. 1a, FIG. 1b, or FIG. 1c, the network device and the terminal device may communicate with each other by using a licensed spectrum, or may communicate with each other by using an unlicensed spectrum (which may also be referred to as an unlicensed spectrum), or may communicate with each other by using both the licensed spectrum and the unlicensed spectrum.

The network architecture shown in FIG. 1a, FIG. 1b, or FIG. 1c may be applied to communication systems of various radio access technologies (RATs), for example, may be applied to an LTE communication system, may be applied to a 5G (or referred to as new radio (NR)) communication system, may be applied to a transition system between the LTE communication system and the 5G communication system, where the transition system may also be referred to as a 4.5G communication system, or certainly may be applied to a future communication system. Network architectures and service scenarios described in embodiments of this application are intended to describe the technical solutions in embodiments of this application more clearly, and do not constitute any limitation on the technical solutions provided in embodiments of this application. A person of ordinary skill in the art may know that, with evolution of the communication network architecture and emergence of new service scenarios, the technical solutions provided in embodiments of this application are also applicable to resolving similar technical problems. An apparatus in the following embodiments of this application may be located in a terminal device or a network device based on a function implemented by the apparatus. When a foregoing CU-DU structure is used, the network device may be a RAN device including a CU and a DU.

In the network architectures shown in FIG. 1a, FIG. 1b, and FIG. 1c, at least one radio bearer (RB) may be established between the terminal device and the network device to transmit data. The terminal device may be a transmit end of the data, and the network device may be a receive end of the data; or the network device may be the transmit end of the data, and the terminal device may be the receive end of the data.

Radio bearers may be classified into a signaling radio bearer (SRB) used to transmit signaling data and a data radio bearer (DRB) used to transmit service data. In embodiments of this application, an example in which the radio bearer is the DRB is used for description. A functional entity set of a same radio bearer includes one PDCP entity, at least two RLC entities corresponding to the PDCP entity, at least one MAC entity corresponding to the at least two RLC entities, and at least one PHY entity corresponding to the at least one MAC entity.

The following describes duplication transmission at a PDCP layer.

After a PDCP duplication transmission function is activated, a data packet of a radio bearer is replicated into a plurality of same data packets (namely, duplicated packets) at the PDCP layer, and then the plurality of data packets are separately delivered to a plurality of different RLC entities for transmission, and then is transmitted to a MAC entity through different logical channels. It should be noted that, retransmission usually refers to retransmission, but duplication transmission in embodiments of this application does not refer to retransmission. Retransmission refers to sending a same data packet again after sending failure of the same data packet, or consecutively sending a same data packet for a plurality of times. Duplication transmission refers to replicating a data packet into a plurality of data packets and separately transmitting the data packets through a plurality of logical channels. "Duplication" herein may also be understood as "replication".

Figure 2:
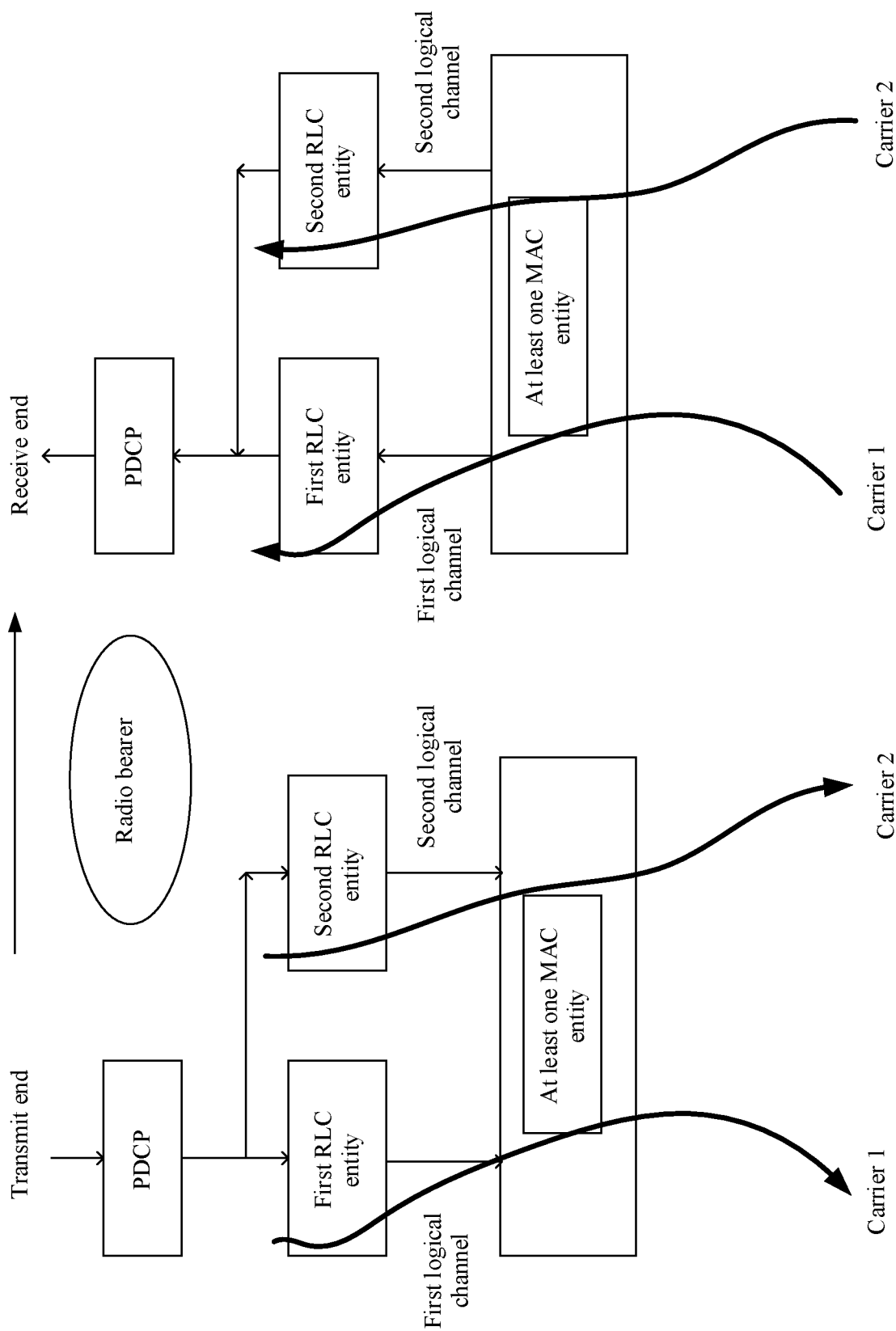
FIG. 2 is a schematic diagram of data transmission according to an embodiment of this application.

FIG. 2 is a schematic diagram of data transmission according to an embodiment of this application. As shown in FIG. 2, a transmit end and a receive end each include a PDCP entity, a first RLC entity corresponding to the PDCP entity, and a second RLC entity corresponding to the PDCP entity, where the first RLC entity corresponds to a first logical channel, and the second RLC entity corresponds to a second logical channel. The transmit end sends, on a carrier 1 corresponding to the first logical channel, data that is on the first logical channel to the receive end, and the receive end receives, on the carrier 1 corresponding to the first logical channel, the data that is on the first logical channel and that is sent by the transmit end. The transmit end sends, on a carrier 2 corresponding to the second logical channel, data that is on the second logical channel to the receive end, and the receive end receives, on the carrier 2 corresponding to the second logical channel, the data that is on the second logical channel. In a duplication mode, duplication transmission is performed by the first RLC entity and the second RLC entity of the transmit end on data from the same PDCP entity, so that reliability of sending the data by the transmit end can be improved.

It should be noted that: (1) FIG. 2 is described by using duplication at the PDCP layer with two logical channels as an example. In another possible embodiment, duplication at the PDCP layer with more logical channels may be further performed. In other words, a radio bearer may transmit, through more logical channels, for example, through three or four logical channels, the data packets replicated at the PDCP layer.

(2) In embodiments of this application, the logical channel may be associated with a carrier, or the logical channel may correspond to the carrier. This includes but is not limited to: If a logical channel configuration indicates that one or more carriers are allowed to be used, it indicates that data transmitted through the logical channel may be transmitted on the indicated carrier, or it indicates that a resource on the indicated carrier may be allocated to the logical channel. In this case, the logical channel may be associated with the indicated carrier. Further, the data transmitted through the logical channel is not transmitted on a carrier other than the carrier associated with the logical channel. For example, in the schematic diagram of data transmission shown in FIG. 2, the first logical channel corresponds to the carrier 1, and the second logical channel corresponds to the carrier 2. In this case, the data on the first logical channel may be transmitted on the carrier 1, and the data on the second logical channel may be transmitted on the carrier 2.

For example, a parameter may be configured for a logical channel, and the parameter is referred to as a parameter A. Values of the parameter A are used to indicate different carriers, indicating that data transmitted on the logical channel may be transmitted only on a carrier specified by the parameter A. For example, if the parameter A is configured for a logical channel 1 and the parameter A indicates the carrier 1, it indicates that data on the logical channel may be transmitted only on the parameter carrier 1. In this way, the logical channel 1 and the carrier 1 may be referred to as having an association relationship, or may be referred to as having a binding relationship or a mapping relationship.

It may be understood that, in embodiments of this application, the carrier may also be replaced with a cell. For example, that the logical channel is associated with the carrier may also be understood as follows: The logical channel is associated with the cell. Association, correspondence, mapping, binding, and the like are all used to express a same meaning, and these words may be adaptively replaced with each other.

The following describes duplication transmission at a PDCP layer in a DC scenario.

The network architecture shown in FIG. 1*a* is used as an example. The terminal device 130 may be connected to two RAN devices at the same time in a DC manner, and the RAN devices may be, for example, the RAN device 1101 and the RAN device 1102. The RAN device 1101 may be a primary network device, and the RAN device 1102 may be a secondary network device. The primary network device and the secondary network device may be network devices in a same radio access technology. For example, both are network devices in a 5G communication system or both are network devices in an LTE communication system. Alternatively, the primary network device and the secondary network device may be network devices in different radio access technologies. For example, one is a network device in an LTE communication system, and the other is a network device in a 5G communication system.

Figure 3A:
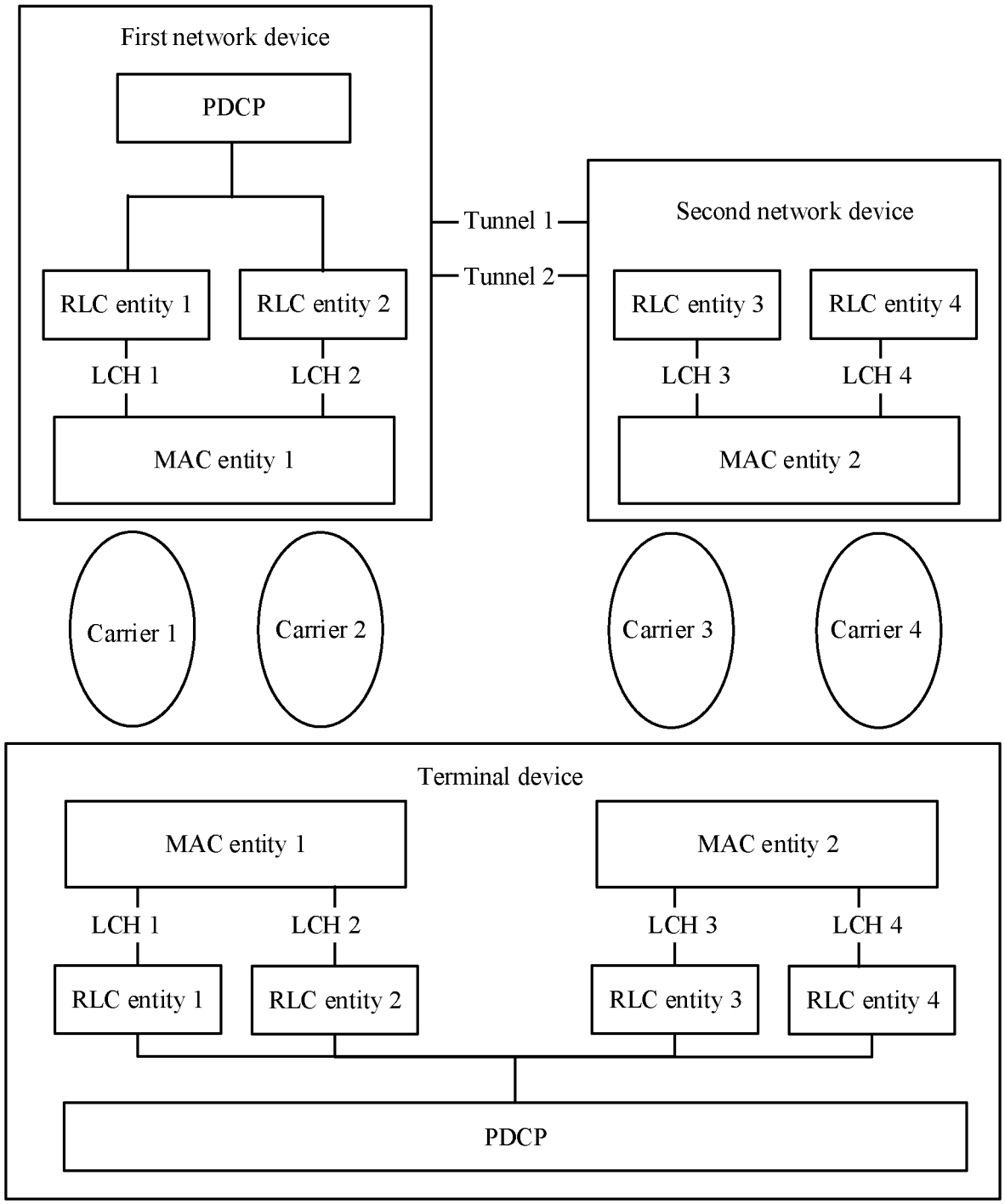
FIG. 3a shows an example of duplication transmission at a PDCP layer in a DC scenario according to an embodiment of this application.

FIG. 3*a* shows an example of duplication transmission at a PDCP layer in a DC scenario. Refer to FIG. 3*a*. A terminal device is connected to a first network device and a second network device. A radio bearer is established between the terminal device and the first network device and between the terminal device and the second network device. The radio bearer may include one or more logical channels. In FIG. 3*a*, an example in which the radio bearer includes four logical channels is used. For the radio bearer, the first network device may include one PDCP entity, two RLC entities, and one MAC entity. For the radio bearer, the second network device may include two RLC entities and one MAC entity. For the radio bearer, the terminal device may include one PDCP entity, four RLC entities, and two MAC entities. For example, the first network device may further have an SDAP entity above the PDCP entity, and the terminal device may further have an SDAP entity above the PDCP entity. The first network device may be a primary network device, and the second network device may be a secondary network device; or the first network device may be a secondary network device, and the second network device may be a primary network device. FIG. 3*a* is described by using an example in which the PDCP entity of the radio bearer is in the first network device. It may be understood that, the PDCP entity of the radio bearer may alternatively be in the second network device, in other words, the PDCP entity of the radio bearer may be in the first network device or in the second network device.

The first network device or the second network device may indicate the terminal device to activate or deactivate a duplication transmission function of the radio bearer. For example, the first network device may send MAC signaling to the terminal device to activate or deactivate the duplication transmission function of the radio bearer. The MAC signaling may include an identifier of the radio bearer and a bitmap. The identifier of the radio bearer may be information used to identify the radio bearer. The bitmap may include a plurality of bits, and each of the plurality of bits corresponds to one of the plurality of logical channels of the radio bearer. If a value of a bit is 1, it indicates that a duplication transmission function of a logical channel corresponding to the bit is activated; if the value of the bit is 0, it indicates that the duplication transmission function of the logical channel corresponding to the bit is deactivated. There may be a plurality of correspondence manners between the plurality of bits and the plurality of logical channels. For example, as shown in FIG. 3*a*, the plurality of logical channels may be first arranged as follows: Logical channels corresponding to the primary network device are before those corresponding to the secondary network device, the logical channels in the primary network device and the logical channels in the secondary network device are separately sorted based on values of identifiers of the logical channels, and then the logical channels and the bits in the bitmap are in one-to-one correspondence.

After the duplication transmission function of the radio bearer is activated, four data packets replicated at the PDCP layer are transmitted to four different RLC entities, and are transmitted to different MAC entities through different logical channels. Finally, different MAC PDUs are formed and transmitted on different carriers. This process is the same for both the network device and the terminal device. A difference is as follows: For the network device, a PDCP layer in the first network device transmits the four replicated data packets to the four different RLC entities, where the four RLC entities are located in the first network device and the second network device; the RLC entities in the first network device transmit the received data packets to the MAC entity in the first network device, and the RLC entities in the second network device transmit the received data packets to the MAC entity in the second network device; and the two MAC entities transmit the data packets through respective carriers. For the terminal device, the four RLC entities and the four MAC entities are all located in the terminal device. Other processes are the same.

For example, at least one tunnel of the radio bearer may be established between the first network device and the second network device. The at least one tunnel is used to transmit the data packets replicated at the PDCP layer to the RLC entities of the second network device, or transmit the data packets received by the RLC entities of the second network device to the PDCP entity. For one radio bearer, a quantity of tunnels may be the same as a quantity of RLC entities or a quantity of logical channels in the second network device (namely, a network device that does not include the PDCP entity of the radio bearer). For example, the second network device includes two RLC entities. Therefore, two tunnels may be established between the first network device and the second network device, and are a tunnel 1 and a tunnel 2.

Figure 3B:
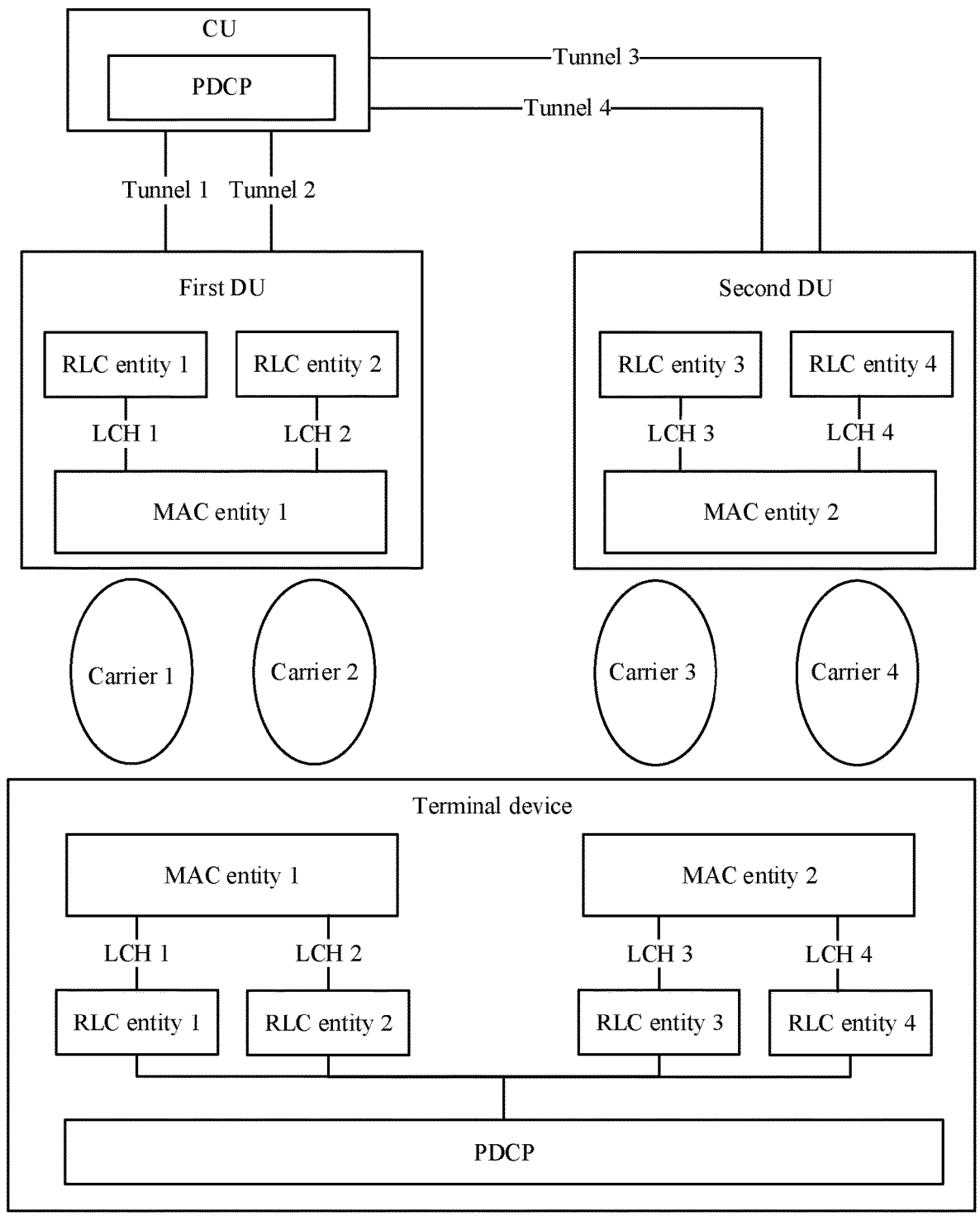
FIG. 3b shows another example of duplication transmission at a PDCP layer in a DC scenario according to an embodiment of this application.

FIG. 3b is another example of duplication transmission at a PDCP layer in a DC scenario. A difference from FIG. 3a lies in that a network device in FIG. 3b includes a CU and at least one DU, and the CU and the at least one DU are deployed separately. Refer to FIG. 3b. A terminal device is connected to a first DU and a second DU, and the first DU and the second DU are connected to the same CU. A radio bearer is established between the terminal device and the network device. The radio bearer may include one or more logical channels. In FIG. 3b, an example in which the radio bearer includes four logical channels is used. For the radio bearer, the CU may include one PDCP entity. For the radio bearer, the first DU may include two RLC entities and one MAC entity. For the radio bearer, the second DU may include two RLC entities and one MAC entity. For the radio bearer, the terminal device may include one PDCP entity, four RLC entities, and two MAC entities. For example, the CU may further have an SDAP entity above the PDCP entity, and the terminal device may further have an SDAP entity above the PDCP entity.

For example, at least one tunnel is established between the CU and the first DU. The at least one tunnel is used to transmit data packets replicated at the PDCP layer to the RLC entities of the first DU, or transmit data packets received by the RLC entities of the first DU to the PDCP entity. A quantity of tunnels established between the CU and the first DU may be the same as a quantity of RLC entities or a quantity of logical channels in the first DU. For example, the first DU includes two RLC entities. Therefore, two tunnels may be established between the CU and the first DU, and are a tunnel 1 and a tunnel 2.

At least one tunnel is established between the CU and the second DU. The at least one tunnel is used to transmit data packets replicated at the PDCP layer to the RLC entities of the second DU, or transmit data packets received by the RLC entities of the second DU to the PDCP entity. A quantity of tunnels established between the CU and the second DU may be the same as a quantity of RLC entities or a quantity of logical channels in the second DU. For example, the second DU includes two RLC entities. Therefore, two tunnels may be established between the CU and the second DU, and are a tunnel 3 and a tunnel 4.

It should be noted that, a plurality of logical channels associated with one radio bearer may include one primary logical channel, and logical channels other than the primary logical channel are secondary logical channels. The primary logical channel is a logical channel that is in an activated state by default and cannot be deactivated. An initial state of the secondary logical channel may be an activated state or a deactivated state. When the secondary logical channel is in the activated state, the secondary logical channel may be deactivated. When the secondary logical channel is in the deactivated state, the secondary logical channel may be activated. In this case, activating or deactivating the logical channel described above may be activating or deactivating a duplication transmission function of the secondary logical channel.

In the scenario shown in FIG. 3a, a primary logical channel may be a logical channel in the first network device, for example, a logical channel 1, and a logical channel 2, a logical channel 3, and a logical channel 4 are all secondary logical channels. In the scenario shown in FIG. 3b, a primary logical channel may be a logical channel in the first DU, for example, a logical channel 1, and a logical channel 2, a logical channel 3, and a logical channel 4 are all secondary logical channels.

In embodiments of this application, a logical channel may also be referred to as a channel. For example, a primary logical channel may be referred to as a primary channel, and a secondary logical channel may also be referred to as a secondary channel.

In the DC scenario, to optimize data transmission, a possible solution provided in embodiments of this application is as follows: For example, in the scenario in FIG. 3a, assistance information is transmitted between the first network device and the second network device. For example, the second network device may send assistance information to the first network device, so that the first network device can optimize data transmission based on the assistance information. For example, the first network device may comprehensively consider the assistance information sent by the second network device, to manage activation or deactivation of a secondary logical channel in the second network device. Similarly, the first network device may also send assistance information to the second network device. An example in which the second network device sends the assistance information to the first network device is used below for description.

For example, the assistance information sent by the second network device may include at least one of the following types of information.

Type 1 is average downlink channel quality indicator (CQI) information of the radio bearer, which refers to an average value of downlink reference signal quality of carriers (for example, the carrier 3 and the carrier 4 in FIG. 3a) associated with the radio bearer in a period of time.

Type 2 is an average of hybrid automatic repeat request (HARQ) failures of the radio bearer, which refers an average of HARQ transmission failures on carriers associated with the radio bearer in a period of time. Receiving a negative acknowledgement (NACK) or not receiving an acknowledgement (ACK) both may be understood as the HARQ transmission failure.

Type 3 is an average of HARQ retransmissions of the radio bearer, which refers an average of HARQ retransmissions on carriers associated with the radio bearer in a period of time.

Type 4 is a downlink radio quality index of the radio bearer, which refers an index of a value of downlink signal quality of carriers associated with the radio bearer. For example, an index 0 indicates lowest quality. A signal quality value may be a value of reference signal received power (RSRP), a value of reference signal received quality (RSRQ), a value of a signal to interference plus noise ratio (SINR), or a value of a CQI.

Type 5 is an uplink radio quality index of the radio bearer, which refers an index of a value of uplink signal quality of carriers associated with the radio bearer.

Type 6 is an average of clear channel assessment failures or an average of detection failures obtained through channel detection before a data packet is sent, which refers an average of clear channel assessment failures on carriers associated with the radio bearer in a period of time.

For example, when the network device and the terminal device communicate with each other by using an unlicensed spectrum, before performing service transmission by using the unlicensed spectrum, the network device or the terminal device needs to perform a channel access process. The network device or the terminal device can send a signal only after the channel access succeeds. The channel access process may also be referred to as a listen before talk (LBT) process, a detect before send process, or a clear channel assessment (CCA) process.

Clear channel assessment may be performed at a granularity of a channel, and the channel may be a segment of a frequency domain resource on a carrier. For example, the frequency domain resource is of 20 MHz. For example, before sending a signal (for example, a data signal) on a channel (for example, a first channel) of the carrier, the terminal device may first detect whether the first channel is idle, for example, detect whether another nearby device is occupying the first channel to send a signal.

Type 7 is a power headroom report, which refers information about a difference that is between maximum transmit power and used power that are of the terminal device on each carrier and that is configured by the second network device for the terminal device. The second network device may obtain the power headroom report in a plurality of manners. For example, the power headroom report may be reported by the terminal device to the second network device.

It should be noted that: (1) Serial numbers of Type 1 to Type 7 is merely one possible example, and may be flexibly adjusted in specific implementation. (2) The carriers associated with the radio bearer may include a carrier associated with each logical channel of the radio bearer. In the assistance information sent by the second network device, the carriers associated with the radio bearer may include carriers associated with the logical channels in the second network device, for example, carriers associated with the carrier 3 and the carrier 4 in FIG. 3a. Similarly, in the assistance information sent by the first network device, the carriers associated with the radio bearer may include carriers associated with the logical channels in the second network device, for example, carriers associated with the carrier 1 and the carrier 2 in FIG. 3a.

In embodiments of this application, the second network device may send the assistance information to the first network device in a plurality of possible data frames, for example, a data frame whose protocol data unit (PDU) type is 0, 1, or 2. Table 1 is an example of a structure of a data frame whose PDU type is 2.

TABLE 1

Example of a data frame structure
Bits (bits)

| 7 | 6 | 5 | 4 | 3 | 2 | 1 | 0 |
|---|---|---|---|---|---|---|---|
| PDU Type (=2) | | | PDCP Duplication Indication | | Assistance Information Indication | Reserved | |
| Reserved | | | | | | PDCP Duplication Activation Suggestion | |
| Quantity of Assistance Information | | | | | | | |
| Assistance Information Type | | | | | | | |
| Quantity of Bytes for Assistance Information | | | | | | | |

TABLE 1-continued

Example of a data frame structure
Bits (bits)

| 7 | 6 | 5 | 4 | 3 | 2 | 1 | 0 |
|---|---|---|---|---|---|---|---|
| Assistance Information (including radio bearer-level radio quality information) | | | | | | | |

As shown in Table 1, the data frame includes the PDU type field (a PDU type used to carry a data frame), the PDCP duplication indication, the assistance information indication, the reserved field (where the reserved field includes a plurality of reserved bits), the PDCP duplication function activation suggestion, the quantity of assistance information, the assistance information type, the quantity of bytes for assistance information, and the assistance information. The following describes the information included in the data frame.

(1) PDCP Duplication Indication and PDCP Duplication Activation Suggestion

The PDCP duplication indication is used to indicate that the data frame includes the PDCP duplication activation suggestion, and the PDCP duplication activation suggestion is used to indicate that it is suggested that a PDCP duplication function of a radio bearer be activated or that a PDCP duplication function of a radio bearer not be activated. For example, the PDCP duplication activation suggestion may include one bit. If a value of the bit is 1, it is suggested that the PDCP duplication function of the radio bearer be activated. If the value of the bit is 0, it is suggested that the PDCP duplication function of the radio bearer not be activated.

(2) Assistance Information Indication and Assistance Information

The assistance information indication is used to indicate that the data frame includes the assistance information, and the assistance information includes at least one of Type 1 to Type 7.

(3) Quantity of Assistance Information, Assistance Information Type, and Quantity of Bytes for Assistance Information The quantity of assistance information is used to indicate a quantity of types of assistance information included in the assistance information.

For example, the second network device sends the assistance information to the first network device in the data frame shown in Table 1. The assistance information may include the uplink radio quality index of the radio bearer (namely, the foregoing Type 5). In this case, the quantity of assistance information is 1, the assistance information type is 5, and the quantity of bytes for assistance information is 1. Table 2 is an example of a data frame structure.

TABLE 2

Another example of a data frame structure
Bits (bits)

| 7 | 6 | 5 | 4 | 3 | 2 | 1 | 0 |
|---|---|---|---|---|---|---|---|
| PDU Type (=2) | | | PDCP Duplication Indication | | Assistance Information Indication | Reserved | |
| | | | Reserved | | | PDCP Duplication Activation Suggestion | |

TABLE 2-continued

Another example of a data frame structure
Bits (bits)

| 7 | 6 | 5 | 4 | 3 | 2 | 1 | 0 |
|---|---|---|---|---|---|---|---|
| Quantity of Assistance Information (=1) ||||||||
| Assistance Information Type (=5) ||||||||
| Quantity of Bytes for Assistance Information (=1) ||||||||
| Uplink Radio Quality Index of the Radio Bearer ||||||||

For another example, the assistance information includes the foregoing Type 1 and Type 2. In this case, the quantity of assistance information is 2, the assistance information type is 1 and 2, and the quantity of bytes for each assistance information is 1. Refer to Table 3.

TABLE 3

Another example of a data frame structure
Bits (bits)

| 7 | 6 | 5 | 4 | 3 | 2 | 1 | 0 |
|---|---|---|---|---|---|---|---|
| PDU Type (=2) | PDCP Duplication Indication | | | | Assistance Information Indication | | Reserved |
| Reserved |||||| | PDCP Duplication Activation Suggestion |
| Quantity of Assistance Information = 2 ||||||||
| Assistance Information Type = 1 ||||||||
| Quantity of Bytes for Assistance Information = 1 ||||||||
| Average Downlink Channel Quality Indicator Information of the Radio Bearer ||||||||
| Assistance Information Type = 2 ||||||||
| Quantity of Bytes for Assistance Information = 1 ||||||||
| Average of HARQ Failures of the Radio Bearer ||||||||

According to the foregoing solution, when the first network device and the second network device transmit the assistance information, the assistance information is the radio bearer-level assistance information, for example, the average downlink channel quality indicator information of the radio bearer. Consequently, a communication device that receives the assistance information cannot learn of radio quality information of each logical channel, and cannot make an optimal decision during data transmission optimization.

On this basis, embodiments of this application provide a communication method, to transmit logical channel-level radio quality information, so that data transmission can be optimized more effectively based on the logical channel-level radio quality information.

For example, the communication method provided in embodiments of this application may include: A second communication apparatus establishes at least one tunnel for a first radio bearer, where the at least one tunnel includes a first tunnel. The second communication apparatus sends a first message to a first communication apparatus, where the first message is carried in the first tunnel, the first message includes radio quality information of each of M logical channels, the M logical channels are associated with the first radio bearer, and an RLC entity corresponding to the M logical channels is located in the second communication apparatus. According to the method, the second communication apparatus may send logical channel-level radio quality information to the first communication apparatus, so that the data transmission can be optimized more effectively based on the logical channel-level radio quality information.

The following describes embodiments of this application in detail with reference to Embodiment 1 and Embodiment 2.

Embodiment 1

In Embodiment 1, an example in which the communication method provided in embodiments of this application is applicable to the scenario shown in FIG. 3a is used. The method may be performed by a first communication apparatus and a second communication apparatus. The first communication apparatus may be located in the first network device in FIG. 3a. For example, the first communication apparatus may be the first network device or a communication apparatus that can support the first network device in implementing a function required for the method. Certainly, the first communication apparatus may be another communication apparatus, for example, a chip or a chip system. The second communication apparatus may be located in the second network device in FIG. 3a. For example, the second communication apparatus may be the second network device in FIG. 3a or a communication apparatus that can support the second network device in implementing a function required for the method. Certainly, the second communication apparatus may be another communication apparatus, for example, a chip or a chip system. For ease of description, the following uses an example in which the method is performed by the first network device and the second network device. In other words, an example in which the first communication apparatus is the first network device and the second communication apparatus is the second network device is used.

Figure 4:
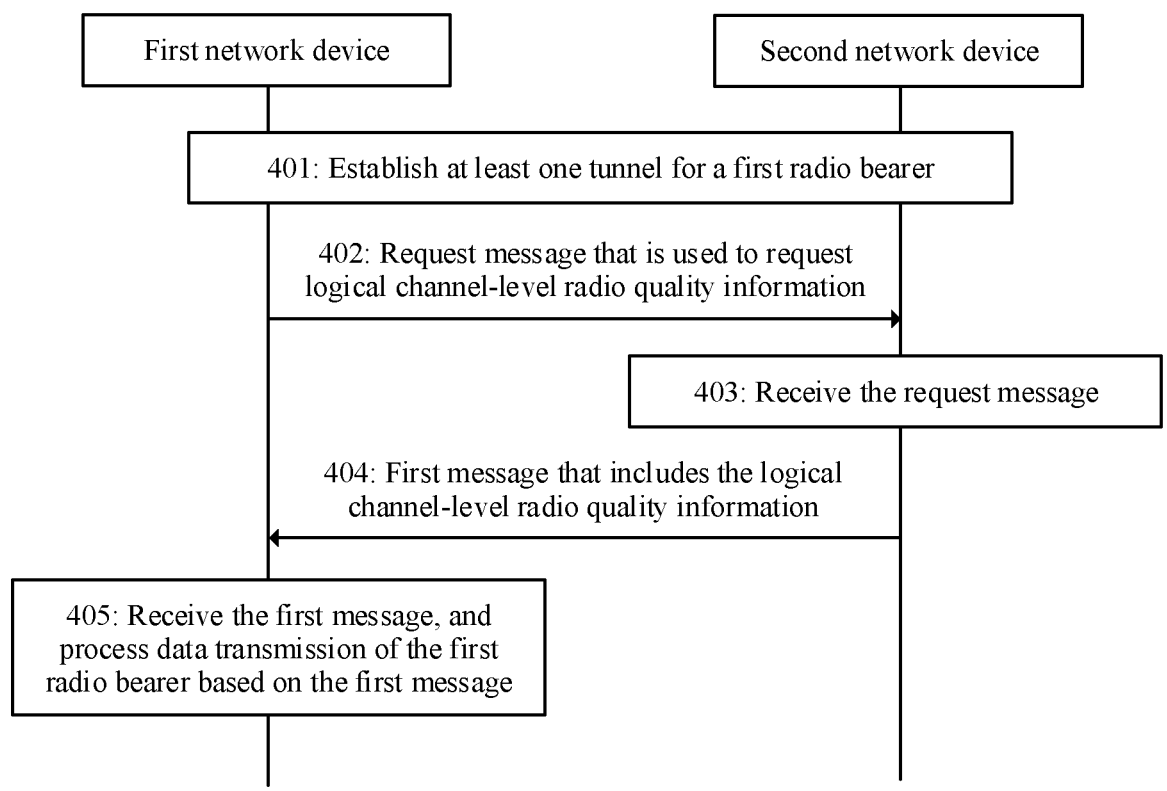
FIG. 4 is a schematic flowchart corresponding to a communication method according to Embodiment 1 of this application.

FIG. 4 is a schematic flowchart corresponding to a communication method according to Embodiment 1 of this application. As shown in FIG. 4, the method includes the following steps.

Step 401: The first network device and the second network device establish at least one tunnel for a first radio bearer.

Herein, a quantity of tunnels may be the same as a quantity of secondary logical channels in the second network device. For example, the second network device includes two secondary logical channels. Therefore, two tunnels may be established between the first network device and the second network device, and are a tunnel 1 and a tunnel 2.

Step 402: The first network device sends a request message to the second network device, where the request message is used to request assistance information.

Correspondingly, in step 403, the second network device receives the request message.

In embodiments of this application, the first network device may send the request message in a plurality of manners. For example, the first network device may send the request message through the tunnel 1 or the tunnel 2. Correspondingly, the second network device receives the request message through the tunnel 1 or the tunnel 2, and then the second network device may learn that the request message is used to request assistance information related to the first radio bearer.

In an example, that the request message is used to request assistance information may include: The request message is used to request logical channel-level radio quality information, or the request message is used to request radio quality information of logical channel granularity. Based on the example, in a possible implementation, the request message may include indication information 1, and the indication information 1 is used to indicate that the assistance information requested by the request message includes the logical channel-level radio quality information. For example, if the request message includes the indication information 1, it indicates that the assistance information requested by the request message includes the logical channel-level radio quality information; or if the request message does not include the indication information 1, it indicates that the assistance information requested by the request message includes radio bearer-level radio quality information. For another example, the indication information 1 may include one bit. If a value of the bit is 1, it indicates that the assistance information requested by the request message includes the logical channel-level radio quality information; or if the value of the bit is 0, it indicates that the assistance information requested by the request message includes radio bearer-level radio quality information. In another possible implementation, the request message may be a newly designed control frame, and the control frame is dedicated to requesting the logical channel-level radio quality information.

Further, that the request message is used to request logical channel-level radio quality information may include: The request message is used to request radio quality information of a logical channel that is associated with the first radio bearer and that has best radio quality in the secondary logical channels of the second network device. For example, the request message may include a quantity (m) of logical channels, indicating that the request message is used to request radio quality information of m logical channels with best radio quality, where m is an integer greater than or equal to 1.

Step 404: The second network device sends a first message to the second network device based on the request message, where the first message includes the assistance information, and the first message may be carried in one of the at least one tunnel.

Correspondingly, in step 405, the first network device receives the first message, and processes data transmission of the first radio bearer based on the first message.

The assistance information may include radio quality information of each of M logical channels, and the M logical channels herein may be M secondary logical channels. The M logical channels are associated with the first radio bearer, and the M logical channels are located in the second network device, in other words, an RLC entity associated with the M logical channels is located in the second network device.

In an example, the assistance information sent by the second network device based on the request message may include radio quality information of each of all the secondary logical channels of the second network device, that is, M=2. In another example, if the request message is used to request radio quality information of a logical channel with best radio quality, M=1; or if the request message is used to request the radio quality information of m logical channels with best radio quality, M=m.

For example, the first message may further include at least one of the following: indication information 2, suggestion information of each of the M logical channels, or indication information 3. The following separately describes in detail information that may be included in the first message.

(1) Assistance Information

For example, the M logical channels include a first logical channel. Radio quality information of the first logical channel may include at least one of average downlink channel quality indicator information of the first logical channel, an average of HARQ failures of the first logical channel, an average of HARQ retransmissions of the first logical channel, a downlink radio quality index of the first logical channel, an uplink radio quality index of the first logical channel, or an average of clear channel assessment failures of the first logical channel.

In an example, the assistance information may include at least one of the following types of information.

Type 1 is average downlink channel quality indicator information of a logical channel, for example, the average downlink channel quality indicator information of the first logical channel, which refers an average value of downlink reference signal quality of a carrier associated with the first logical channel in a period of time.

Type 2 is an average of HARQ failures of a logical channel, for example, the average of HARQ failures of the first logical channel, which refers an average of HARQ transmission failures on a carrier associated with the first logical channel in a period of time.

Type 3 is an average of HARQ retransmissions of a logical channel, for example, the average of HARQ retransmissions of the first logical channel, which refers an average of HARQ retransmissions on a carrier associated with the first logical channel in a period of time.

Type 4 is a downlink radio quality index of a logical channel, for example, the downlink radio quality index of the first logical channel, which refers an index of a value of downlink signal quality of a carrier associated with the first logical channel.

Type 5 is an uplink radio quality index of a logical channel, for example, the uplink radio quality index of the first logical channel, which refers an index of a value of uplink signal quality of a carrier associated with the first logical channel.

Type 6 is an average of clear channel assessment failures of a logical channel, for example, the average of clear channel assessment failures of the first logical channel, which refers an average of clear channel assessment failures on a carrier associated with the first logical channel in a period of time.

Type 7 is a power headroom report.

It should be noted that, for specific implementation of Type 1 to Type 7 herein, refer to the foregoing related description. A difference lies in that Type 1 to Type 6 in Embodiment 1 are all logical channel-level radio quality information, while Type 1 to Type 6 in the foregoing related description are all radio bearer-level radio quality information.

In this embodiment of this application, when the assistance information includes the logical channel-level radio quality information, this embodiment of this application may provide three possible manners to help the first network device distinguish radio quality information of each logical channel. Description is given below.

Manner 1: The radio quality information of the M logical channels included in the assistance information may be sorted based on IDs of the M logical channels, for example, sorted in descending order or ascending order based on the IDs of the M logical channels. The following uses an example in which the radio quality information of the M logical channels is sorted in ascending order based on the IDs of the M logical channels for description. The IDs of the logical channels may be serial numbers of the logical channels. For example, if the M logical channels include the logical channel 3 and the logical channel 4 shown in FIG. 3a, radio quality information of the logical channel 3 may be located before radio quality information of the logical channel 4.

When Manner 1 is used, the second network device may send the assistance information to the first network device through any tunnel (for example, the tunnel 1 or the tunnel 2) in the at least one tunnel, so that the second network device has high flexibility in sending the assistance information.

Manner 2: It may be preset that the at least one tunnel is in one-to-one correspondence with the secondary logical channel in the second network device. For example, the tunnel 1 corresponds to the logical channel 3, and the tunnel 2 corresponds to the logical channel 4. In this case, the second network device may send radio quality information of the logical channel 3 through the tunnel 1, and may send radio quality information of the logical channel 4 through the tunnel 2.

The tunnel may correspond to the secondary logical channel in a plurality of manners. For example, the at least one tunnel is sorted in an order in a tunnel list or based on tunnel establishment time to obtain a tunnel sequence, and the secondary logical channels in the second network device are sorted based on IDs of the logical channels to obtain a logical channel sequence. Tunnels in the tunnel sequence are in one-to-one correspondence with logical channels in the logical channel sequence.

In an optional solution, the at least one tunnel may be further configured to correspond to a secondary logical channel in the first network device, so that the first network device may send logical channel-level radio quality information to the second network device. For example, if a quantity of secondary logical channels in the first network device is equal to the quantity of tunnels, the at least one tunnel may be in one-to-one correspondence with the secondary logical channel in the first network device; or if a quantity of secondary logical channels in the first network device is less than the quantity of tunnels, the secondary logical channel in the first network device may be in one-to-one correspondence with a part of the at least one tunnel. For example, refer to FIG. 3*a*. The first network device includes one secondary logical channel, namely, the logical channel 2. In this case, the logical channel 2 may correspond to the tunnel 1, or the logical channel 2 may correspond to the tunnel 2.

In addition, if the quantity of secondary logical channels in the first network device is greater than the quantity of tunnels, one tunnel may be configured to correspond to two or more secondary logical channels. For example, if the first network device includes a secondary logical channel a, a secondary logical channel b, and a secondary logical channel c, the secondary logical channel a and the secondary logical channel b may correspond to the tunnel 1, and the secondary logical channel c corresponds to the tunnel 2. When the first network device sends assistance information through the tunnel 1, the assistance information includes radio quality information of the secondary logical channel a and radio quality information of the secondary logical channel b. Further, the radio quality information of the secondary logical channel a and the radio quality information of the secondary logical channel b may be sorted based on IDs of the logical channels.

Manner 3: The assistance information may include an ID of each of the M logical channels.

In Manner 3, when the second network device needs to send radio quality information of a logical channel (that is, M=1), the second network device may send the radio quality information through any tunnel (for example, the tunnel 1 or the tunnel 2) in the at least one tunnel. When the second network device needs to send radio quality information of a plurality of logical channels, the second network device may send the radio quality information through any tunnel in the at least one tunnel or may be sent through a plurality of tunnels in the at least one tunnel.

For example, if the second network device needs to send radio quality information of the logical channel 3 and radio quality information of the logical channel 4, the second network device may send the assistance information through the tunnel 1 or the tunnel 2 (where the assistance information includes an ID of the logical channel 3, the radio quality information of the logical channel 3, an ID of the logical channel 4, and the radio quality information of the logical channel 4); or may send assistance information 1 through the tunnel 1 (where the assistance information 1 includes an ID of the logical channel 3 and the radio quality information of the logical channel 3), and may send assistance information 2 through the tunnel 2 (where the assistance information 2 includes an ID of the logical channel 4 and the radio quality information of the logical channel 4).

It should be noted that, Manner 1 to Manner 3 described herein are merely three possible examples. In specific implementation, another possible manner may be used, provided that the receive end distinguishes the radio quality information of each logical channel.

(2) Indication Information 2

The indication information 2 is used to indicate that radio quality information included in the first message is logical channel-level radio quality information. The indication information 2 may also be referred to as a channel-level assistance information indication.

(3) Suggestion Information of Each of the M Logical Channels

For example, the M logical channels include the first logical channel. Suggestion information of the first logical channel is used to indicate at least one of the following: suggesting that uplink duplication transmission of the first logical channel be activated; suggesting that downlink duplication transmission of the first logical channel be activated; suggesting that uplink duplication transmission of the first logical channel not be activated; or suggesting that downlink duplication transmission of the first logical channel not be activated.

For example, the suggestion information of the first logical channel may include one bit. If a value of the bit is 1, it indicates that it is suggested that the uplink duplication transmission of the first logical channel be activated and/or the downlink duplication transmission of the first logical channel be activated; or if the value of the bit is 0, it indicates that it is suggested that the uplink duplication transmission of the first logical channel not be activated and/or the downlink duplication transmission of the first logical channel not be activated.

(4) Indication Information 3

The indication information 3 is used to indicate that the first message includes the suggestion information of each of the M logical channels. The indication information 3 may also be referred to as a channel-level PDCP duplication indication.

In embodiments of this application, there may be a plurality of possible structures of the first message. The following describes in detail the possible structures of the first message with reference to Example 1 and Example 2.

(1) Example 1

The first message may be a data frame whose PDU type is 0, 1, or 2.

For example, the first message is a data frame whose PDU is 2. In this case, in an optional solution, the data frame may include a field 1, a field 2, and a field 3. The field 1 is used to carry the indication information 2, the field 2 is used to carry the suggestion information of each of the M logical channels, and the field 3 is used to carry the indication information 3. For example, the field 1, the field 2, and the field 3 may occupy reserved bits in the data frame. For example, the field 1 may occupy one reserved bit, the field 3 may occupy one reserved bit, and a quantity of bits occupied by the field 2 may be greater than or equal to the quantity of secondary logical channels in the second network device. For example, the field 2 may occupy three reserved bits. For example, the secondary logical channels of the second network device may be sorted based on the IDs of the logical channels, and then correspond to bits in the field 2. For example, the logical channel 3 of the second network device corresponds to the first bit in the field 2, in other words, the first bit is used to carry suggestion information of the logical channel 3; the logical channel 4 corresponds to the second bit in the field 2, in other words, the second bit is used to carry suggestion information of the logical channel 4. Further, when reading the data frame, the first network device may ignore the third bit in the field 2.

Table 4 shows an example of a structure of a data frame carrying logical channel-level radio quality information.

TABLE 4

Example of a structure of a data frame carrying
logical channel-level radio quality information
Bits (bits)

| 7 | 6 | 5 | 4 | 3 | 2 | 1 | 0 |
|---|---|---|---|---|---|---|---|
| PDU Type (=2) | | | | PDCP Duplication Indication | Assistance Information Indication | Indication Information 3 | Indication Information 2 |
| Reserved | | | | Suggestion Information of Each of the M Logical Channels | | | PDCP Duplication Activation Suggestion |
| Quantity of Assistance Information | | | | | | | |
| Assistance Information Type | | | | | | | |
| Quantity of Bytes for Assistance Information | | | | | | | |
| Assistance Information (including the logical channel-level radio quality information) | | | | | | | |

As shown in Table 4, in an optional solution, when the data frame includes the indication information 3, indicating that the data frame includes the suggestion information of each of the M logical channels, the first network device may ignore or not consider the PDCP duplication activation suggestion in the data frame when reading the data frame.

In another optional solution, when the data frame includes a PDCP duplication activation suggestion, if a value of the PDCP duplication activation suggestion is 1 (that is, it is suggested that a PDCP duplication function of a radio bearer be activated), the first network device may consider the suggestion information of each of the M logical channels in the data frame when reading the data frame; if a value of the PDCP duplication activation suggestion is 0 (that is, it is suggested that a PDCP duplication function of a radio bearer not be activated), the first network device may not consider the suggestion information of each of the M logical channels in the data frame when reading the data frame.

Based on the structure of a data frame shown in Table 4, an example in which the assistance information includes an uplink radio quality index of the logical channel 3 and an uplink radio quality index of the logical channel 4 is used. When Manner 1 is used, the data frame structure may be shown in Table 5.

TABLE 5

Another example of a structure of a data frame carrying
logical channel-level radio quality information
Bits (bits)

| 7 | 6 | 5 | 4 | 3 | 2 | 1 | 0 |
|---|---|---|---|---|---|---|---|
| PDU Type (=2) | | | | PDCP Duplication Indication | Assistance Information Indication | Indication Information 3 | Indication Information 2 |
| Reserved | | | | Suggestion Information of Each of the M Logical Channels | | | PDCP Duplication Activation Suggestion |
| Quantity of Assistance Information (=1) | | | | | | | |
| Assistance Information Type (=5) | | | | | | | |
| Quantity of Bytes for Assistance Information (=2) | | | | | | | |
| Uplink Radio Quality Index of the Logical Channel 3 | | | | | | | |
| Uplink Radio Quality Index of the Logical Channel 4 | | | | | | | |

Based on the structure of a data frame shown in Table 4, an example in which the assistance information includes the uplink radio quality index of the logical channel 3 and the uplink radio quality index of the logical channel 4 is used. When Manner 3 is used, the data frame structure may be shown in Table 6.

TABLE 6

Another example of a structure of a data frame carrying
logical channel-level radio quality information
Bits (bits)

| 7 | 6 | 5 | 4 | 3 | 2 | 1 | 0 |
|---|---|---|---|---|---|---|---|
| PDU Type (=2) | | | | PDCP Duplication Indication | Assistance Information Indication | Indication Information 3 | Indication Information 2 |
| Reserved | | | | Suggestion Information of Each of the M Logical Channels | | | PDCP Duplication Activation Suggestion |
| Quantity of Assistance Information (=1) | | | | | | | |
| Assistance Information Type (=5) | | | | | | | |
| Quantity of Bytes for Assistance Information (=4) | | | | | | | |
| ID of the Logical Channel 3 | | | | | | | |
| Uplink Radio Quality Index of the Logical Channel 3 | | | | | | | |
| ID of the Logical Channel 4 | | | | | | | |
| Uplink Radio Quality Index of the Logical Channel 4 | | | | | | | |

(2) Example 2

The first message may be a newly designed data frame. For example, the first message is a data frame whose PDU type is greater than 2. For example, the first message is a data frame whose PDU type is 3. In this case, in an optional solution, the data frame may include a field 1, a field 2, and a field 3. The field 1 is used to carry the indication information 2, the field 2 is used to carry the suggestion information of each of the M logical channels, and the field 3 is used to carry the indication information 3. For example, the field 1 may include one reserved bit, the field 3 may include one reserved bit, and a quantity of bits included in the field 2 may be greater than or equal to the quantity of secondary logical channels in the first network device. For example, the field 2 includes 3 bits. Table 7 shows an example of a structure of a data frame carrying logical channel- level radio quality information.

TABLE 7

Example of a structure of a data frame carrying
logical channel-level radio quality information
Bits (bits)

| 7 | 6 | 5 | 4 | 3 | 2 | 1 | 0 |
|---|---|---|---|---|---|---|---|
| PDU Type (=3) | | | Indication Information 3 | | Indication Information 2 | | Reserved |
| Reserved | | | | Suggestion Information of Each of the M Logical Channels | | | |
| Quantity of Assistance Information | | | | | | | |
| Assistance Information Type | | | | | | | |
| Quantity of Bytes for Assistance Information | | | | | | | |
| Radio Quality Assistance Information (including the logical channel-level radio quality information) | | | | | | | |

Based on the structure of a data frame shown in Table 7, an example in which the assistance information includes an uplink radio quality index of the logical channel 3 and an uplink radio quality index of the logical channel 4 is used. When Manner 1 is used, the data frame structure may be shown in Table 8.

TABLE 8

Another example of a structure of a data frame carrying
logical channel-level radio quality information
Bits (bits)

| 7 | 6 | 5 | 4 | 3 | 2 | 1 | 0 |
|---|---|---|---|---|---|---|---|
| PDU Type (=3) | | | Indication Information 3 | | Indication Information 2 | | Reserved |
| Reserved | | | | Suggestion Information of Each of the M Logical Channels | | | |
| Quantity of Assistance Information (=1) | | | | | | | |
| Assistance Information Type (=5) | | | | | | | |
| Quantity of Bytes for Assistance Information (=2) | | | | | | | |
| Uplink Radio Quality Index of the Logical Channel 3 | | | | | | | |
| Uplink Radio Quality Index of the Logical Channel 4 | | | | | | | |

In embodiments of this application, the first network device may process the data transmission of the first radio bearer in a plurality of manners based on the first message. For example, the first network device activates or deactivates uplink and/or downlink duplication transmission of a secondary logical channel of the first radio bearer based on the first message.

According to the solution in the foregoing Embodiment 1, the second network device may send the logical channel-level radio quality information to the first network device, so that the first network device may optimize the data transmission more effectively based on the logical channel-level radio quality information.

Embodiment 2

In Embodiment 2, an example in which the communication method provided in embodiments of this application is applicable to the scenario shown in FIG. 3b is used. The method may be performed by a first communication apparatus and a second communication apparatus. The first communication apparatus may be the first DU in FIG. 3b. For example, the first communication apparatus may be the first DU or a communication apparatus that can support the first DU in implementing a function required for the method. Certainly, the first communication apparatus may be another communication apparatus, for example, a chip or a chip system. The second communication apparatus may be the second DU in FIG. 3b. For example, the second communication apparatus may be located in the second DU in FIG. 3b or a communication apparatus that can support the second DU in implementing a function required for the method. Certainly, the second communication apparatus may be another communication apparatus, for example, a chip or a chip system. For ease of description, the following uses an example in which the method is performed by the first DU and the second DU. In other words, an example in which the first communication apparatus is the first DU and the second communication apparatus is the second DU is used.

Figure 5:
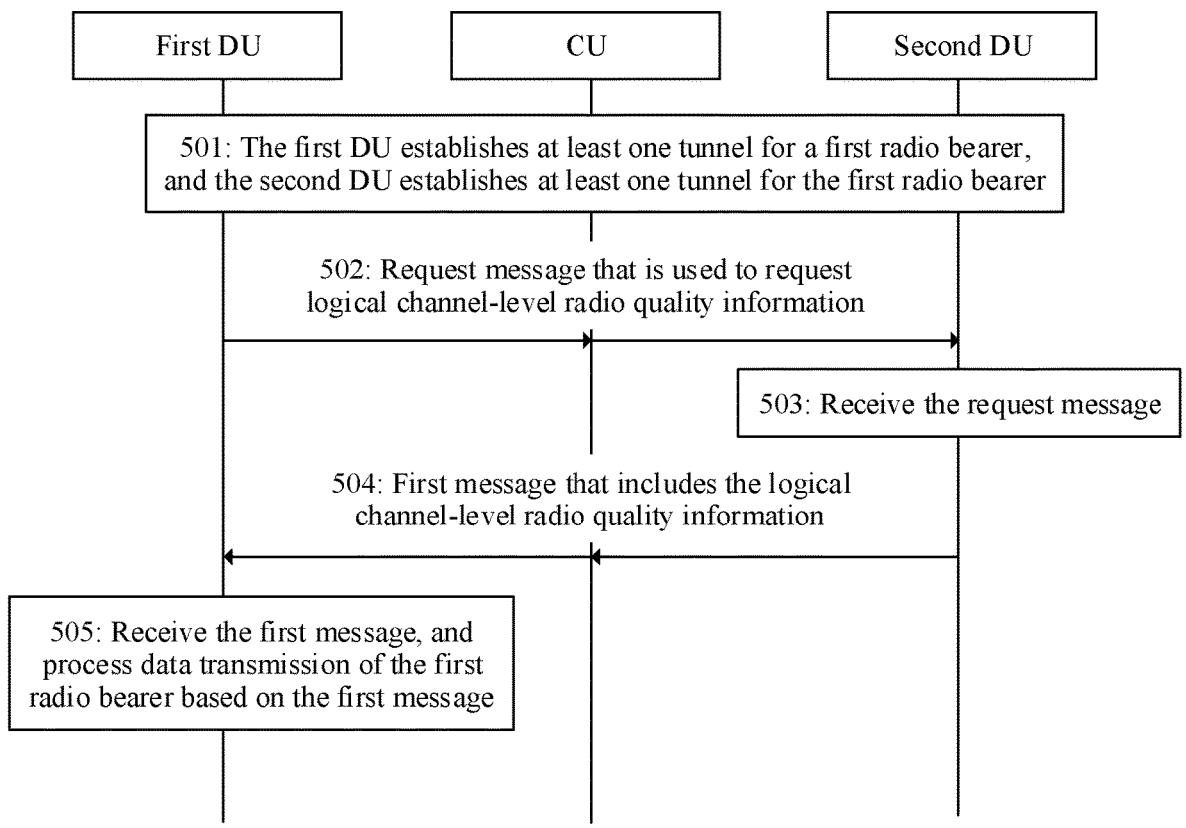
FIG. 5 is a schematic flowchart corresponding to a communication method according to Embodiment 2 of this application.

FIG. 5 is a schematic flowchart corresponding to a communication method according to Embodiment 2 of this application. As shown in FIG. 5, the method includes the following steps.

Step 501: The first DU establishes at least one tunnel for a first radio bearer, and the second DU establishes at least one tunnel for the first radio bearer.

In addition, a quantity of tunnels established by the first DU may be the same as a quantity of logical channels in the first DU. For example, the first DU includes two logical channels. Therefore, two tunnels may be established between the first DU and a CU, and are a tunnel 1 and a tunnel 2.

A quantity of tunnels established by the second DU may be the same as a quantity of logical channels in the second DU. For example, the second DU includes two logical channels. Therefore, two tunnels may be established between the second DU and the CU, and are a tunnel 3 and a tunnel 4.

Step 502: The CU sends a request message to the second DU, where the request message is used to request assistance information. For example, the request message is used to request logical channel-level radio quality information.

Correspondingly, in step 503, the second DU receives the request message.

For example, the CU may actively send the request message to the second DU; or the first DU may trigger the CU to send the request message to the second DU. For example, the first DU sends the request message to the CU, and then the CU forwards the request message to the second DU after receiving the request message. The first DU may send the request message to the CU through the tunnel 1 or the tunnel 2. After receiving the request message, the CU may forward the request message to the second DU through the tunnel 3 or the tunnel 4.

Step 504: The second DU sends a first message to the first DU, where the first message includes radio quality information of each of M logical channels. The M logical channels are associated with the first radio bearer, and the M logical channels are located in the second DU, in other words, an RLC entity associated with the M logical channels is located in the second DU.

Correspondingly, in step 505, the first DU receives the first message from the second DU, and processes data transmission of the first radio bearer based on the first message.

For example, the second DU may send the first message to the CU based on the request message, and then the CU sends the first message to the first DU after receiving the first message.

In this embodiment of this application, because the CU needs to forward the first message of the second DU to the first DU, Manner 1 and Manner 3 described in Embodiment 1 may be used, so that the first DU may distinguish the radio quality information of each logical channel.

According to the solution in the foregoing Embodiment 2, the second DU may send the logical channel-level radio quality information to the first DU, so that the first DU may optimize the data transmission more effectively based on the logical channel-level radio quality information.

For the foregoing Embodiment 1 and Embodiment 2, it should be noted that: (1) Embodiment 1 is mainly described by using an example in which the second network device sends the assistance information to the first network device. In another possible embodiment, the first network device may also send the assistance information to the second network device, and implementation thereof may be adaptively performed with reference to Embodiment 1. Embodiment 2 is mainly described by using an example in which the second DU sends the assistance information to the first DU. In another possible embodiment, the first DU may also send assistance information to the second DU, and implementation thereof may be adaptively performed with reference to Embodiment 2.

(2) The foregoing focuses on the differences between Embodiment 1 and Embodiment 2. Other content than the differences of the two embodiments may be cross-referenced. For example, for content related to the first message in Embodiment 2, refer to the description in Embodiment 1.

(3) Serial numbers of steps in the flowcharts (for example, FIG. 4 or FIG. 5) described in Embodiment 1 and Embodiment 2 are merely an example of an execution procedure, and do not constitute a limitation on an execution sequence of the steps. In embodiments of this application, there is no strict execution sequence between steps that do not have a time sequence dependency relationship with each other. In addition, not all steps shown in the flowcharts are mandatory steps. For example, step 402 and step 403 in FIG. 4 are optional steps, and may be selectively performed based on an actual requirement.

(4) In the foregoing description, an example in which the communication method provided in embodiments of this application is applicable to the two scenarios shown in FIG. 3a and FIG. 3b is used. However, the communication method in embodiments of this application is not limited to the two scenarios, and is further adaptively applicable to another possible scenario, for example, may be applied to a scenario in which duplication transmission is performed between terminal devices. For example, data may be transmitted between a terminal device 1 and a terminal device 1 by using a radio bearer 1, and the radio bearer 1 is configured to have a duplication transmission function. In this case, the terminal device 1 (or the terminal device 2) may report logical channel-level radio quality information to a network device in the manner in embodiments of this application, so that the network device can activate or deactivate a logical channel of the radio bearer 1 based on the logical channel-level radio quality information.

The foregoing mainly describes the solutions provided in embodiments of this application from a perspective of interaction between communication apparatuses. It may be understood that, to implement the foregoing functions, the communication apparatus may include corresponding hardware structures and/or software modules for performing the functions. A person skilled in the art should be easily aware that, in combination with units and algorithm steps of the examples described in embodiments disclosed in this specification, embodiments of this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the communication apparatus may be divided into functional units based on the foregoing method examples. For example, the communication apparatus may be divided into each functional unit based on a corresponding function, or two or more functions may be integrated into one unit. The integrated unit may be implemented in a form of hardware, or may be implemented in a form of a software functional unit.

Figure 6:
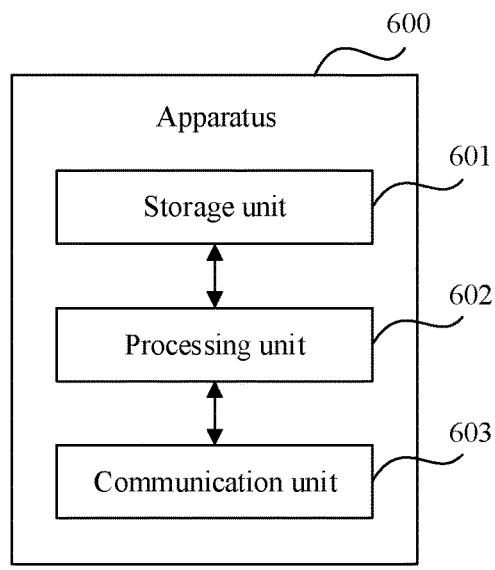
FIG. 6 is a possible example block diagram of an apparatus according to an embodiment of this application.

When the integrated unit is used, FIG. 6 is a possible example block diagram of an apparatus according to an embodiment of this application. As shown in FIG. 6, the apparatus 600 may include a processing unit 602 and a communication unit 603. The processing unit 602 is configured to control and manage actions of the apparatus 600. The communication unit 603 is configured to support the apparatus 600 in communicating with another device. Optionally, the communication unit 603 is also referred to as a transceiver unit, and may include a receiving unit and/or a sending unit, which are respectively configured to perform a receiving operation and a sending operation. The apparatus 600 may further include a storage unit 601, configured to store program code and/or data of the apparatus 600.

The apparatus 600 may be the second network device in Embodiment 1, or may be a chip disposed in the second network device; or may be the second DU in Embodiment 2, or may be a chip disposed in the second DU. The processing unit 602 may support the apparatus 600 in performing actions of the second network device or the second DU in the foregoing method examples. Alternatively, the processing unit 602 mainly performs internal actions of the second network device or the second DU in the method examples, and the communication unit 603 may support communication between the apparatus 600 and another apparatus. For example, the communication unit 603 may be configured to perform step 403 and step 404 in FIG. 4, and step 503 and step 504 in FIG. 5. The processing unit 602 is configured to perform step 401 in FIG. 4 and step 501 in FIG. 5.

In an embodiment, the processing unit 602 is configured to establish at least one tunnel for a first radio bearer, where the at least one tunnel includes a first tunnel. The communication unit 603 is configured to send a first message to a first communication apparatus, where the first message is carried in the first tunnel, the first message includes radio quality information of each of M logical channels, and the M logical channels are associated with the first radio bearer, where M is an integer greater than or equal to 1.

In a possible design, the radio quality information of each logical channel includes at least one of the following: average downlink channel quality indicator (CQI) information corresponding to each logical channel; an average of hybrid automatic repeat request (HARQ) failures corresponding to each logical channel; an average of HARQ retransmissions corresponding to each logical channel; a downlink radio quality index corresponding to each logical channel; an uplink radio quality index corresponding to each logical channel; or an average of clear channel assessment failures corresponding to each logical channel.

In a possible design, the first message further includes a power headroom report, and the power headroom report is obtained by the second communication apparatus from a terminal device.

In a possible design, the radio quality information of the M logical channels is sorted based on identifiers (IDs) of the M logical channels; the M logical channels correspond to the first tunnel; or the first message further includes an identifier of each of the M logical channels.

In a possible design, the first message further includes suggestion information of each of the M logical channels, the M logical channels include a first logical channel, and suggestion information of the first logical channel is used to indicate at least one of the following: suggesting that uplink duplication transmission of the first logical channel be activated; suggesting that downlink duplication transmission of the first logical channel be activated; suggesting that uplink duplication transmission of the first logical channel not be activated; or suggesting that downlink duplication transmission of the first logical channel not be activated.

In a possible design, the first message further includes first indication information, and the first indication information is used to indicate that the first message includes the suggestion information of each of the M logical channels.

In a possible design, a protocol data unit (PDU) type of the first message is 0, 1, or 2, or the PDU type of the first message is an integer greater than 2.

In a possible design, the communication unit 603 is configured to receive a request message from the first communication apparatus, where the request message is used to request logical channel-level radio quality information.

In a possible design, the communication unit 603 is configured to receive a request message from a CU, where the request message is used to request logical channel-level radio quality information.

In a possible design, that the request message is used to request radio quality information of logical channel granularity includes: The request message is used to request the radio quality information of each of M logical channels, and the M logical channels are logical channels with best radio quality in logical channels associated with the first radio bearer.

The apparatus 600 may be the first network device in Embodiment 1, or may be a chip disposed in the first network device; or may be the first DU in Embodiment 2, or may be a chip disposed in the first DU. The processing unit 602 may support the apparatus 600 in performing actions of the first network device or the first DU in the foregoing method examples. Alternatively, the processing unit 602 mainly performs internal actions of the first network device or the first DU in the method examples, and the communication unit 603 may support communication between the apparatus 600 and another apparatus. For example, the communication unit 603 may be configured to perform step 402 and step 405 in FIG. 4, and step 502 and step 505 in FIG. 5. The processing unit 602 is configured to perform step 401 in FIG. 4 and step 501 in FIG. 5.

In an embodiment, the communication unit 603 is configured to receive a first message from a second communication apparatus, where the first message includes radio quality information of each of M logical channels, and the M logical channels are associated with a first radio bearer, where M is an integer greater than or equal to 1. Then the processing unit 602 is configured to process data transmission of the first radio bearer based on the first message.

In a possible design, the radio quality information of each logical channel includes at least one of the following: average downlink CQI information corresponding to each logical channel; an average of HARQ failures corresponding to each logical channel; an average of HARQ retransmissions corresponding to each logical channel; a downlink radio quality index corresponding to each logical channel; an uplink radio quality index corresponding to each logical channel; or an average of clear channel assessment failures corresponding to each logical channel.

In a possible design, the first message further includes a power headroom report, and the power headroom report is obtained by the second communication apparatus from a terminal device.

In a possible design, the radio quality information of the M logical channels is sorted based on IDs of the M logical channels.

In a possible design, the M logical channels correspond to a first tunnel of the first radio bearer, and the first message is carried in the first tunnel.

In a possible design, the first message further includes an identifier of each of the M logical channels.

In a possible design, the first message further includes suggestion information of each of the M logical channels, the M logical channels include a first logical channel, and suggestion information of the first logical channel is used to indicate at least one of the following: suggesting that uplink duplication transmission of the first logical channel be activated; suggesting that downlink duplication transmission of the first logical channel be activated; suggesting that uplink duplication transmission of the first logical channel not be activated; or suggesting that downlink duplication transmission of the first logical channel not be activated.

In a possible design, the first message further includes first indication information, and the first indication information is used to indicate that the first message includes the suggestion information of each of the M logical channels.

In a possible design, a protocol data unit (PDU) type of the first message is 0, 1, or 2, or the PDU type of the first message is an integer greater than 2.

In a possible design, the communication unit 603 is configured to send a request message to a second communication apparatus, where the request message is used to request logical channel-level radio quality information.

In a possible design, the communication unit 603 is configured to send the request message to a second communication apparatus through a CU, where the request message is used to request logical channel-level radio quality information.

In a possible design, that the request message is used to request logical channel-level radio quality information includes: The request message is used to request the radio quality information of each of M logical channels, and the M logical channels are logical channels with best radio quality in logical channels associated with the first radio bearer.

It should be understood that, division into units in the foregoing apparatus is merely division based on logical functions. During actual implementation, all or some of the units may be integrated into one physical entity, or may be physically separated. In addition, all the units in the apparatus may be implemented in a form of software invoked by a processing element, or may be implemented in a form of hardware; or some units may be implemented in a form of software invoked by a processing element, and some units may be implemented in a form of hardware. For example, the units may be separately disposed processing elements, or may be integrated into a chip of the apparatus for implementation. In addition, the units may be stored in a memory in a program form, and is invoked by a processing element of the apparatus to perform functions of the units. In addition, all or some of the units may be integrated, or may be implemented independently. The processing element herein may also be referred to as a processor, and may be an integrated circuit having a signal processing capability. During implementation, steps in the foregoing methods or the foregoing units may be implemented by using a hardware integrated logic circuit in a processor element, or may be implemented in the form of software invoked by the processing element.

For example, a unit in any one of the foregoing apparatuses may be one or more integrated circuits configured to implement the foregoing method, for example, one or more application-specific integrated circuits (ASICs), one or more microprocessors (digital signal processors, DSPs), one or more field programmable gate arrays (FPGAs), or a combination of at least two of the integrated circuits. For another example, when the unit in the apparatus may implement steps by scheduling a program by a processing element, the processing element may be a processor, for example, a central processing unit (CPU) or another processor that can invoke the program. For another example, the units may be integrated together and implemented in a form of a system-on-a-chip (SoC).

The foregoing receiving unit is an interface circuit of the apparatus, and is configured to receive a signal from another apparatus. For example, when the apparatus is implemented by a chip, the receiving unit is an interface circuit that is of the chip and that is configured to receive a signal from another chip or apparatus. The foregoing sending unit is an interface circuit of the apparatus, and is configured to send a signal to another apparatus. For example, when the apparatus is implemented by a chip, the sending unit is an interface circuit that is of the chip and that is configured to send a signal to another chip or apparatus.

Figure 7:
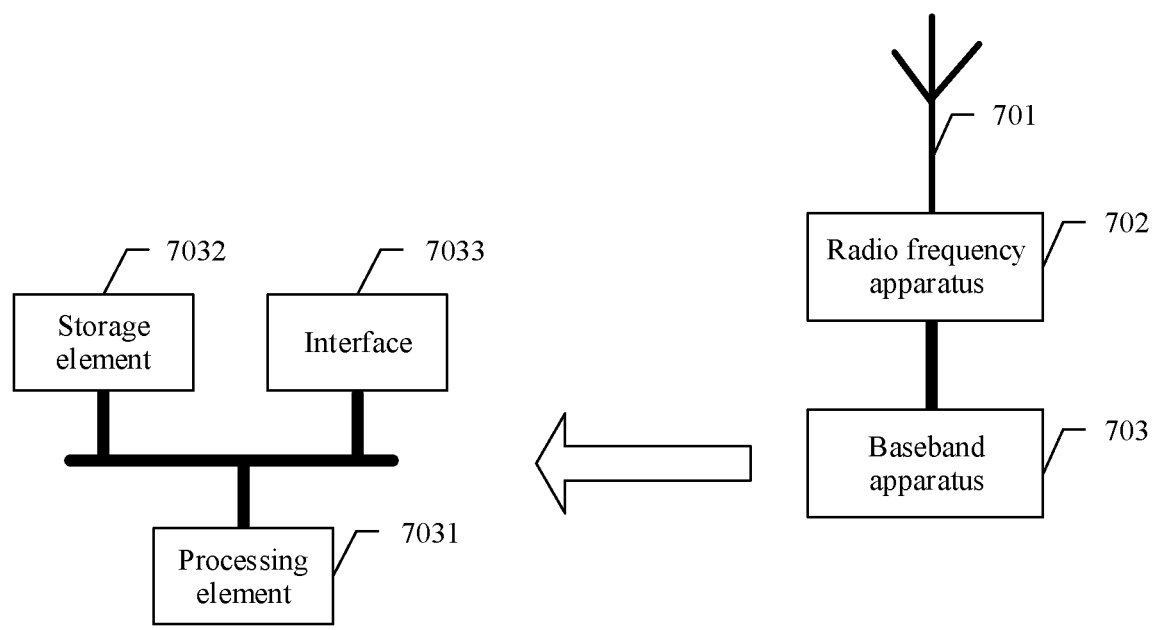
FIG. 7 is a schematic diagram of a structure of a communication apparatus according to an embodiment of this application.

FIG. 7 is a schematic diagram of a structure of a communication apparatus according to an embodiment of this application. The communication apparatus may be the first communication apparatus or the second communication apparatus in the foregoing embodiments, for example, may be the first network device or the second network device in Embodiment 1, or may be the first DU or the second DU in Embodiment 2. The communication apparatus is configured to implement operations of the first communication apparatus or the second communication apparatus in the foregoing embodiments. For example, the communication apparatus is a network device. As shown in FIG. 7, the network device includes an antenna 701, a radio frequency apparatus 702, and a baseband apparatus 703. The antenna 701 is connected to the radio frequency apparatus 702. In an uplink direction, the radio frequency apparatus 702 receives, through the antenna 701, information sent by a terminal device, and sends, to the baseband apparatus 703 for processing, the information sent by the terminal device. In a downlink direction, the baseband apparatus 703 processes the information from the terminal device, and sends the information to the radio frequency apparatus 702. The radio frequency apparatus 702 processes the information from the terminal device, and then sends processed information to the terminal device through the antenna 701.

The baseband apparatus 703 may include one or more processing elements 7031, for example, include one main control CPU and another integrated circuit. In addition, the baseband apparatus 703 may further include a storage element 7032 and an interface 7033. The storage element 7032 is configured to store a program and data. The interface 7033 is configured to exchange information with the radio frequency apparatus 702, and the interface is, for example, a common public radio interface (CPRI). The foregoing apparatus used for the network device may be located in the baseband apparatus 703. For example, the foregoing apparatus used for the network device may be a chip on the baseband apparatus 703. The chip includes at least one processing element and an interface circuit. The processing element is configured to perform the steps of any one of the methods performed by the network device. The interface circuit is configured to communicate with another apparatus. In an implementation, units in the network device may implement the steps in the foregoing methods by scheduling a program by the processing element. For example, the apparatus used in the network device includes a processing element and a storage element. The processing element invokes a program stored in the storage element, to perform the method performed by the network device in the foregoing method embodiments. The storage element may be a storage element, namely, an on-chip storage element, that is located on a same chip as the processing element, or may be a storage element, namely, an off-chip storage element, that is located on a different chip from the processing element.

In another implementation, units in the network device that implement the steps in the foregoing methods may be configured as one or more processing elements. The processing elements are disposed in the baseband apparatus. The processing element herein may be an integrated circuit, for example, one or more ASICs, one or more DSPs, one or more FPGAs, or a combination of the types of integrated circuits. These integrated circuits may be integrated to form a chip.

The units in the network device that implement the steps in the foregoing methods may be integrated together, and implemented in a form of a system-on-a-chip (SoC). For example, the baseband apparatus includes the SoC chip, configured to implement the foregoing methods. At least one processing element and storage element may be integrated into the chip, and the processing element invokes a program stored in the storage element to implement the foregoing methods performed by the network device. Alternatively, at least one integrated circuit may be integrated into the chip, to implement the foregoing methods performed by the network device. Alternatively, with reference to the foregoing implementations, functions of some units may be implemented by invoking a program by the processing element, and functions of some units may be implemented by the integrated circuit.

It can be learned that the foregoing apparatus used in the network device may include at least one processing element and an interface circuit. The at least one processing element is configured to perform any one of the methods that are provided in the foregoing method embodiments and performed by the network device. The processing element may perform some or all steps performed by the network device in a first manner, to be specific, by invoking the program stored in the storage element; or may perform some or all steps performed by the network device in a second manner, to be specific, by using a hardware integrated logic circuit in the processing element in combination with instructions; or may certainly perform, by combining the first manner and the second manner, some or all steps performed by the network device.

The processing element herein is the same as that described above, and may be implemented by using a processor. A function of the processing element may be the same as a function of the processing unit described in FIG. 6. For example, the processing element may be a general-purpose processor, for example, a CPU, or may be one or more integrated circuits configured to implement the foregoing methods, for example, one or more ASICs, one or more microprocessors DSPs, or one or more FPGAs, or a combination of at least two of the integrated circuit forms. The storage element herein is the same as that described above, and may be implemented by using a memory. A function of the storage element may be the same as a function of the storage unit described in FIG. 6. The storage element may be one memory, or an umbrella term of a plurality of memories.

The communication apparatus shown in FIG. 7 may implement the processes related to the network device or the DU in the method embodiment shown in FIG. 4 or FIG. 5. Operations and/or functions of modules in the communication apparatus shown in FIG. 7 are separately used to implement corresponding procedures in the foregoing method embodiments. For details, refer to the description in the foregoing method embodiments. To avoid repetition, detailed description is properly omitted herein.

A person skilled in the art should understand that embodiments of this application may be provided as a method, a system, or a computer program product. Therefore, this application may use a form of a hardware-only embodiment, a software-only embodiment, or an embodiment with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the methods, the devices (systems), and the computer program product according to this application. It should be understood that, computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specified function in one or more processes in the flowcharts and/or in one or more blocks in the block diagrams.

It is clear that a person skilled in the art can make various modifications and variations to this application without departing from the spirit and scope of this application. This application is intended to cover these modifications and variations of this application provided that they fall within the scope of the claims of this application and equivalent technologies thereof.

What is claimed is:

1. A communication method, wherein the method comprises:
   establishing, by a communication apparatus, at least one tunnel for a first radio bearer, wherein the at least one tunnel comprises a first tunnel; and
   sending, by the communication apparatus, a first message to another communication apparatus, wherein the first message is carried in the first tunnel, the first message comprises radio quality information of each of M logical channels, wherein the radio quality information of the M logical channels is sorted based on identifiers (IDs) of the M logical channels; and
   the M logical channels are associated with the first radio bearer, wherein M is an integer greater than or equal to 1.

2. The method according to claim 1, wherein the radio quality information of each logical channel comprises at least one of the following:
   average downlink channel quality indicator (CQI) information corresponding to each logical channel;
   an average of hybrid automatic repeat request (HARQ) failures corresponding to each logical channel;
   an average of HARQ retransmissions corresponding to each logical channel;
   a downlink radio quality index corresponding to each logical channel;
   an uplink radio quality index corresponding to each logical channel; or
   an average of clear channel assessment failures corresponding to each logical channel.

3. The method according to claim 1, wherein the first message further comprises a power headroom report, and the power headroom report is obtained by the communication apparatus from a terminal device.

4. The method according to claim 1, wherein
   the M logical channels correspond to the first tunnel.

5. The method according to claim 1, wherein
   the first message further comprises an identifier of each of the M logical channels.

6. The method according to claim 1, wherein the first message further comprises first information of each of the M logical channels, the M logical channels comprise a first logical channel, and first information of the first logical channel indicates at least one of the following:
   suggesting that uplink duplication transmission of the first logical channel be activated;
   suggesting that downlink duplication transmission of the first logical channel be activated;
   suggesting that the uplink duplication transmission of the first logical channel not be activated; or
   suggesting that the downlink duplication transmission of the first logical channel not be activated.

7. The method according to claim 6, wherein the first message further comprises first indication information, and the first indication information indicates that the first message comprises the first information of each of the M logical channels.

8. A communication apparatus, comprising:
   at least one processor; and one or more memories including computer instructions that, when executed by the at least one processor, cause the communication apparatus to perform operations comprising:

establishing at least one tunnel for a first radio bearer, wherein the at least one tunnel comprises a first tunnel; and sending a first message to another communication apparatus, wherein the first message is carried in the first tunnel, the first message comprises radio quality information of each of M logical channels, and the M logical channels are associated with the first radio bearer, wherein M is an integer greater than or equal to 1.

9. The communication apparatus according to claim 8, wherein the radio quality information of each logical channel comprises at least one of the following:

average downlink channel quality indicator (CQI) information corresponding to each logical channel;

an average of hybrid automatic repeat request (HARQ) failures corresponding to each logical channel;

an average of HARQ retransmissions corresponding to each logical channel;

a downlink radio quality index corresponding to each logical channel;

an uplink radio quality index corresponding to each logical channel; or an average of clear channel assessment failures corresponding to each logical channel.

10. The communication apparatus according to claim 8, wherein the first message further comprises a power headroom report, and the power headroom report is obtained by the communication apparatus from a terminal device.

11. The communication apparatus according to claim 8, wherein
the M logical channels correspond to the first tunnel.

12. The communication apparatus according to claim 8, wherein
the first message further comprises an identifier of each of the M logical channels.

13. A first communication apparatus, comprising:
at least one processor; and
one or more memories including computer instructions that, when executed by the at least one processor, cause the first communication apparatus to perform operations comprising:
receiving a first message from a second communication apparatus, wherein the first message comprises radio quality information of each of M logical channels, wherein the radio quality information of the M logical channels is sorted based on identifiers (IDs) of the M logical channels, and the M logical channels are associated with a first radio bearer, wherein M is an integer greater than or equal to 1; and
processing data transmission of the first radio bearer based on the first message.

14. The first communication apparatus according to claim 13, wherein the radio quality information of each logical channel comprises at least one of the following:

average downlink channel quality indicator (CQI) information corresponding to each logical channel;

an average of hybrid automatic repeat request (HARQ) failures corresponding to each logical channel;

an average of HARQ retransmissions corresponding to each logical channel;

a downlink radio quality index corresponding to each logical channel;

an uplink radio quality index corresponding to each logical channel; or an average of clear channel assessment failures corresponding to each logical channel.

15. The first communication apparatus according to claim 13, wherein the first message further comprises a power headroom report, and the power headroom report is obtained by the second communication apparatus from a terminal device.

16. The first communication apparatus according to claim 13, wherein
the M logical channels correspond to a first tunnel of the first radio bearer, and the first message is carried in the first tunnel.

17. The first communication apparatus according to claim 13, wherein
the first message further comprises an identifier of each of the M logical channels.

18. The first communication apparatus according to claim 13, wherein the first message further comprises first information of each of the M logical channels, the M logical channels comprise a first logical channel, and first information of the first logical channel indicates at least one of the following:

suggesting that uplink duplication transmission of the first logical channel be activated;

suggesting that downlink duplication transmission of the first logical channel be activated;

suggesting that the uplink duplication transmission of the first logical channel not be activated; or suggesting that the downlink duplication transmission of the first logical channel not be activated.

19. The first communication apparatus according to claim 18, wherein the first message further comprises first indication information, and the first indication information indicates that the first message comprises the first information of each of the M logical channels.

20. The communication apparatus according to claim 8, wherein the first message further comprises first information of each of the M logical channels, the M logical channels comprise a first logical channel, and first information of the first logical channel indicates at least one of the following:

suggesting that uplink duplication transmission of the first logical channel be activated;

suggesting that downlink duplication transmission of the first logical channel be activated;

suggesting that the uplink duplication transmission of the first logical channel not be activated; or suggesting that the downlink duplication transmission of the first logical channel not be activated.

* * * * *